Figure 1:
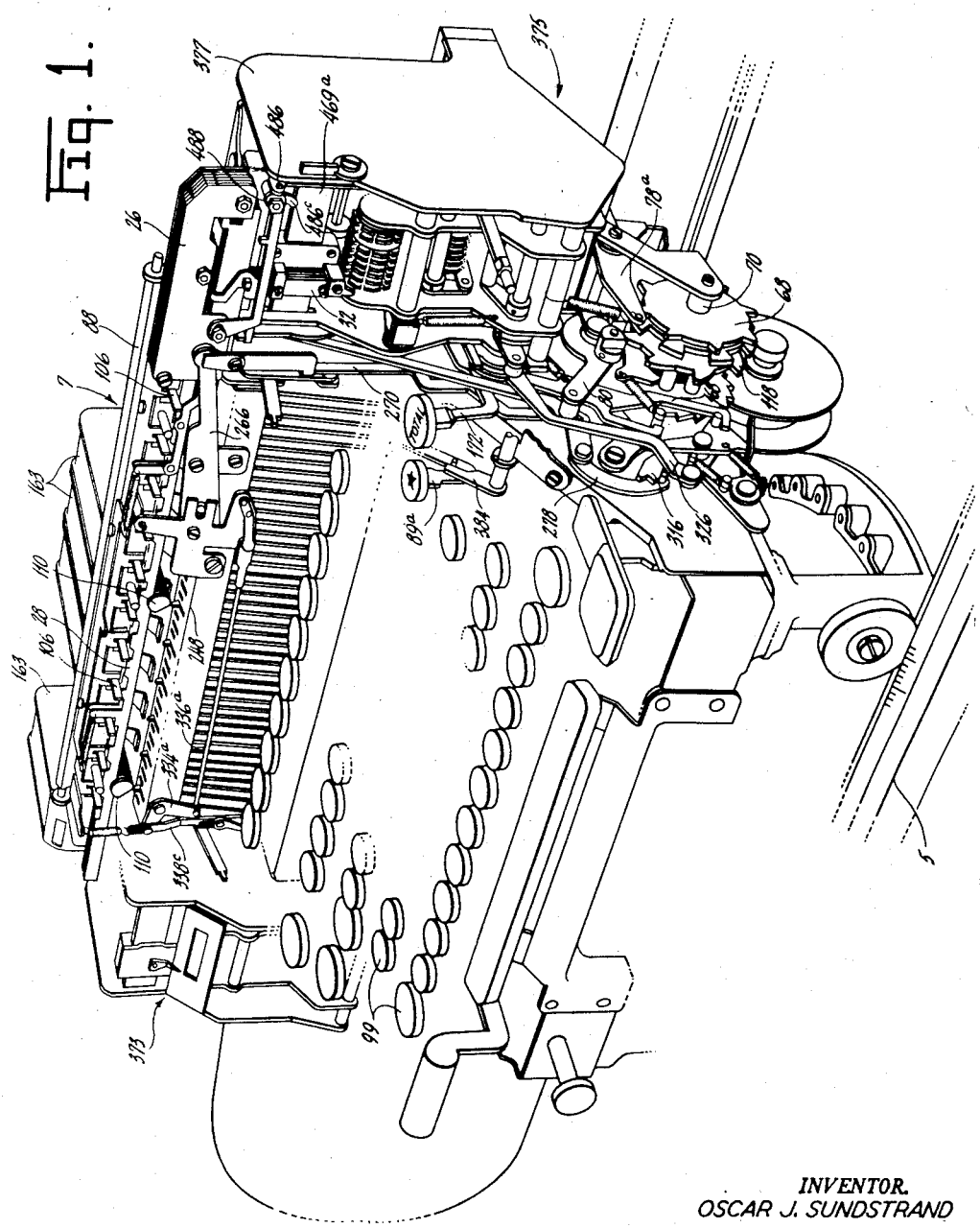

Oct. 30, 1951 O. J. SUNDSTRAND 2,573,508
FUGITIVE ONE-MECHANISM FOR TYPEWRITING AND ACCOUNTING MACHINES
Original Filed Sept. 4, 1944 11 Sheets-Sheet 1

INVENTOR.
OSCAR J. SUNDSTRAND
BY
Jesse A. Holton
ATTORNEY

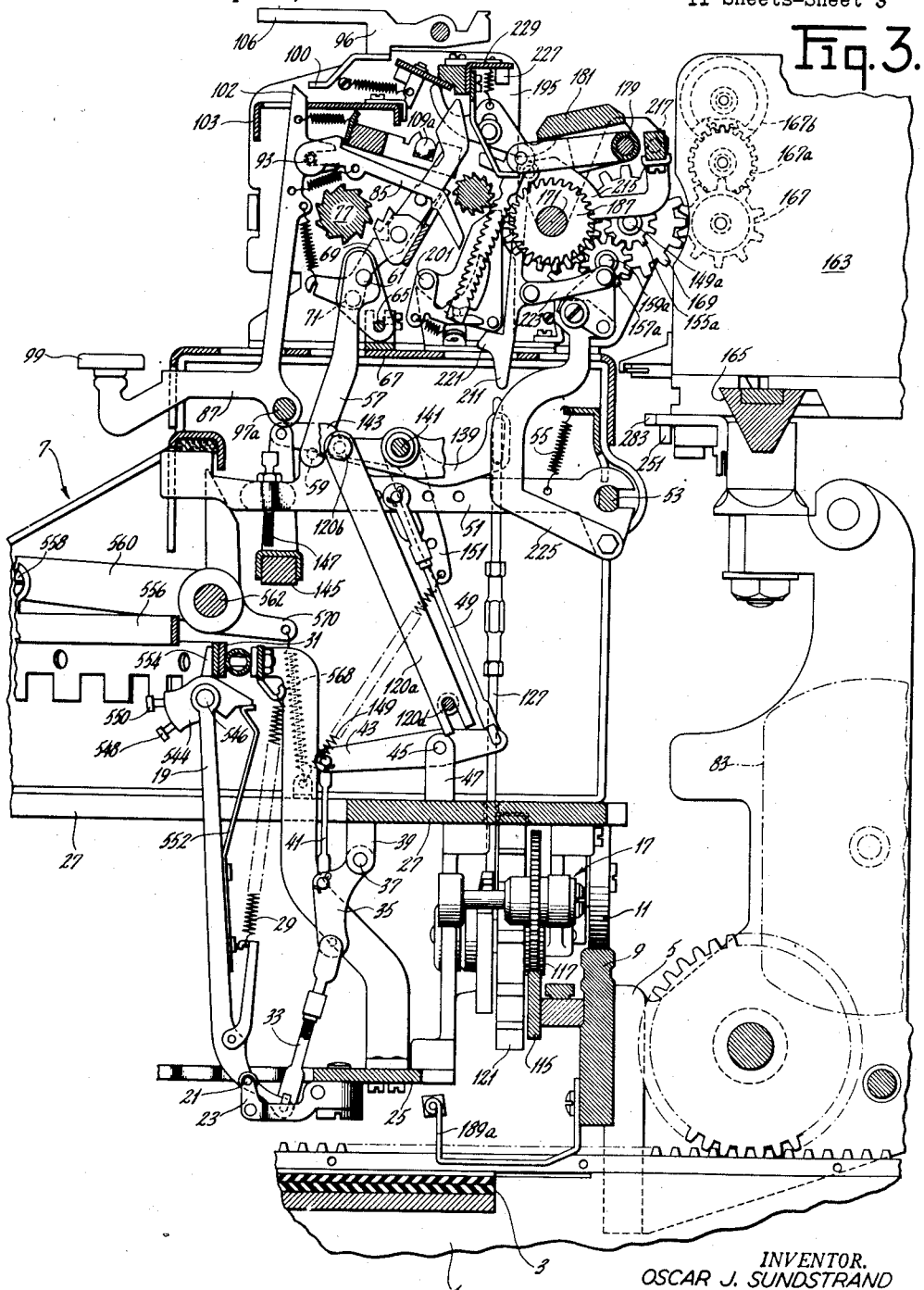

Oct. 30, 1951 O. J. SUNDSTRAND 2,573,508
FUGITIVE ONE-MECHANISM FOR TYPEWRITING AND ACCOUNTING MACHINES
Original Filed Sept. 4, 1944 11 Sheets-Sheet 4
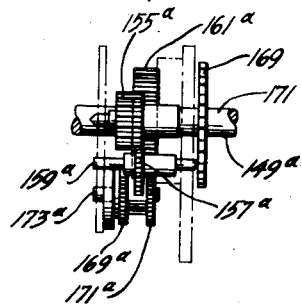
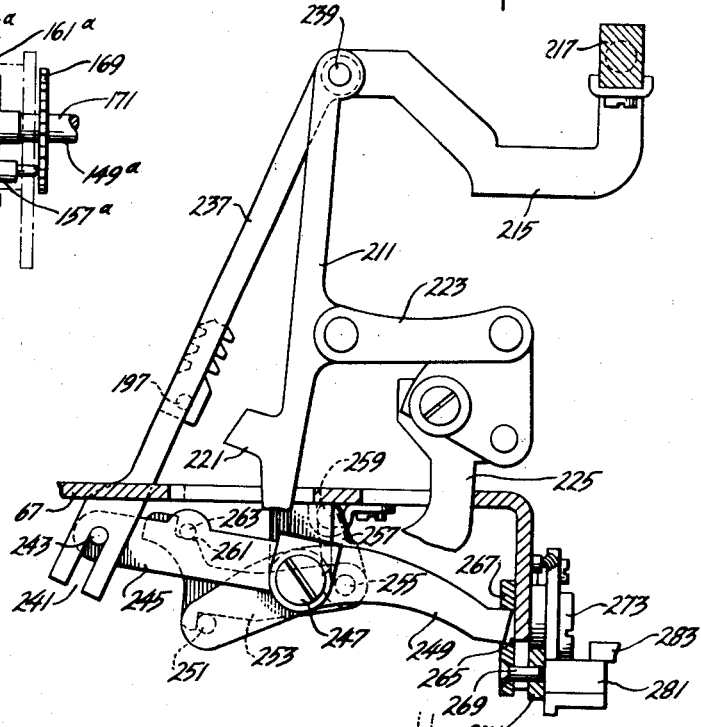
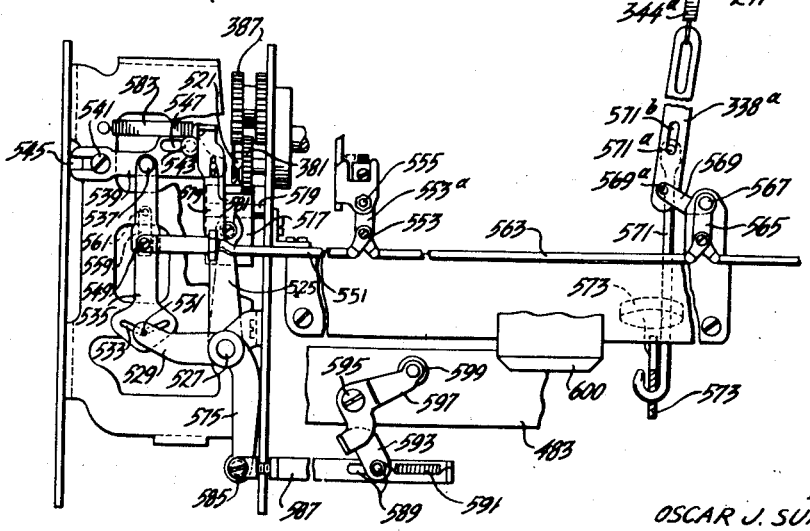
INVENTOR.
OSCAR J. SUNDSTRAND
BY
ATTORNEY Oct. 30, 1951  O. J. SUNDSTRAND  2,573,508
FUGITIVE ONE-MECHANISM FOR TYPEWRITING AND ACCOUNTING MACHINES
Original Filed Sept. 4, 1944  11 Sheets—Sheet 6

INVENTOR.
OSCAR J. SUNDSTRAND
BY
Jose A. Holton
ATTORNEY

Oct. 30, 1951  O. J. SUNDSTRAND  2,573,508
FUGITIVE ONE-MECHANISM FOR TYPEWRITING AND ACCOUNTING MACHINES
Original Filed Sept. 4, 1944  11 Sheets-Sheet 7
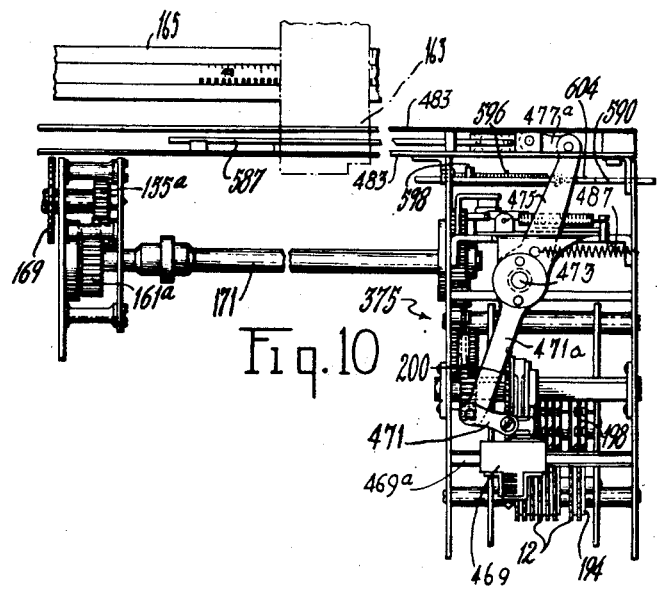
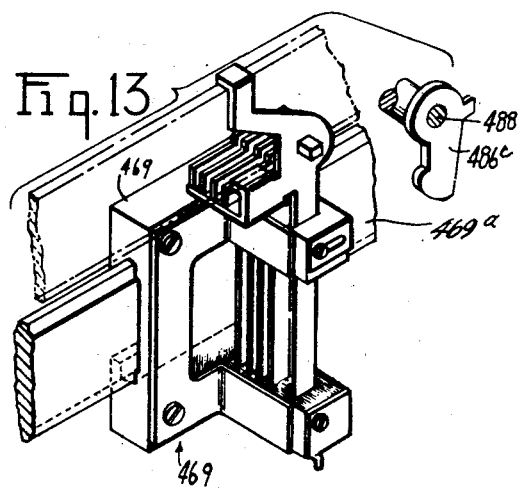
INVENTOR
OSCAR J. SUNDSTRAND
BY Jesse A. Holton
ATTORNEY Oct. 30, 1951   O. J. SUNDSTRAND   2,573,508
FUGITIVE ONE-MECHANISM FOR TYPEWRITING AND ACCOUNTING MACHINES
Original Filed Sept. 4, 1944   11 Sheets-Sheet 8

INVENTOR
OSCAR J. SUNDSTRAND
BY
ATTORNEY

Oct. 30, 1951   O. J. SUNDSTRAND   2,573,508
FUGITIVE ONE-MECHANISM FOR TYPEWRITING AND ACCOUNTING MACHINES
Original Filed Sept. 4, 1944   11 Sheets-Sheet 9

INVENTOR
OSCAR J. SUNDSTRAND
BY Jesse A. Holton
ATTORNEY

Oct. 30, 1951      O. J. SUNDSTRAND      2,573,508
FUGITIVE ONE-MECHANISM FOR TYPEWRITING AND ACCOUNTING MACHINES
Original Filed Sept. 4, 1944      11 Sheets-Sheet 10
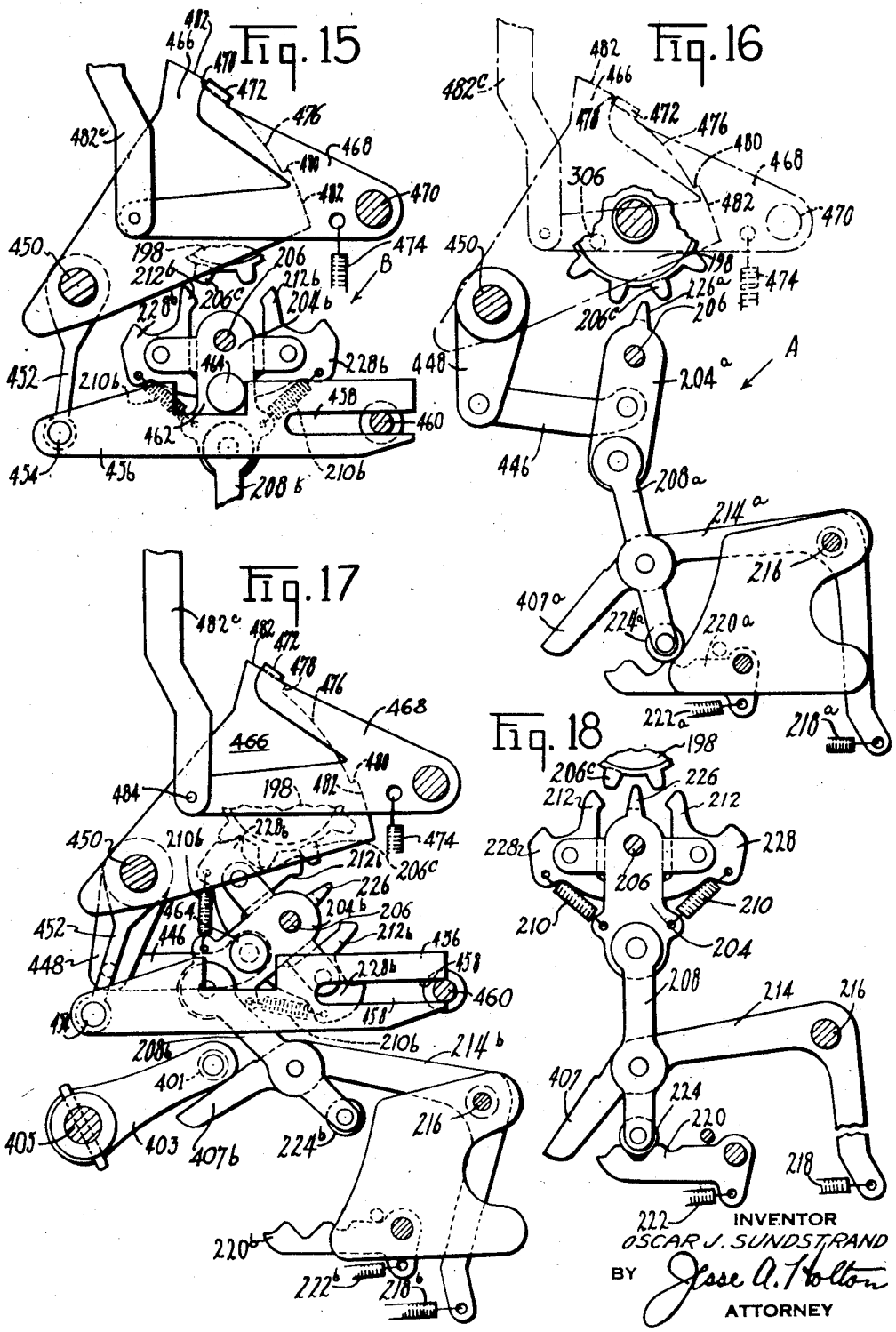
INVENTOR
OSCAR J. SUNDSTRAND
BY
ATTORNEY

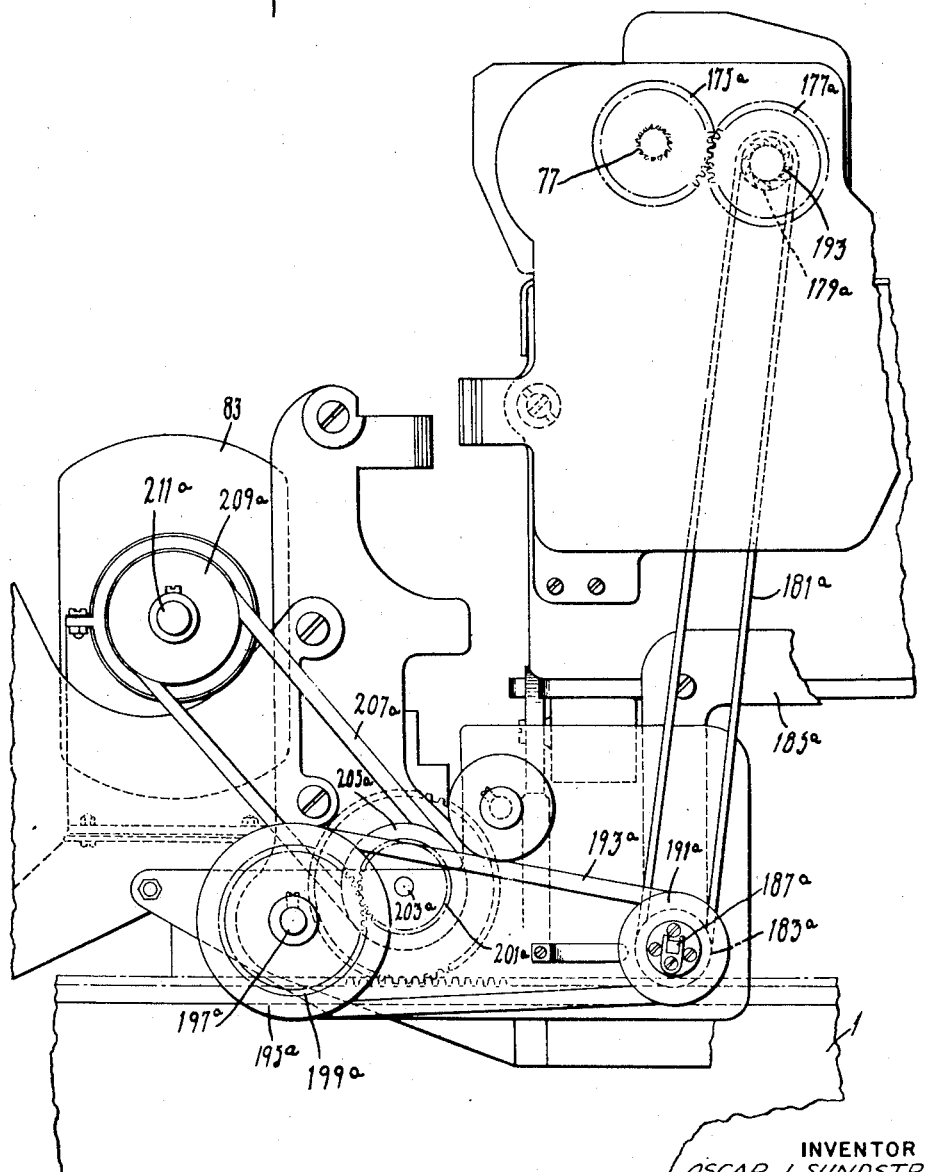

Patented Oct. 30, 1951

2,573,508

UNITED STATES PATENT OFFICE 2,573,508

FUGITIVE ONE MECHANISM FOR TYPEWRITING AND ACCOUNTING MACHINES

Oscar J. Sundstrand, West Hartford, Conn., assignor to Underwood Corporation, New York, N. Y., a corporation of Delaware Original application September 4, 1944, Serial No. 552,656. Divided and this application March 31, 1948, Serial No. 18,143

4 Claims. (Cl. 235—59)

This invention relates to combined typewriting and accounting machines of the type provided with a register or totalizer in which numbers are entered, digit by digit, and more particularly to a "fugitive one" mechanism for such machines.

One object of the present invention is to improve the construction and mode of operation of the accounting mechanism for machines of the above type and to provide such machines with a novel and improved "fugitive one" mechanism.

Another object of the invention is to provide, in machines of the above type having a direct subtraction register or totalizer in which numbers are entered, denomination by denomination, with a novel and improved "fugitive one" mechanism which will operate in a reliable manner both when the totalizer is actuated in an adding direction and when the totalizer is actuated in a subtracting direction.

With the above objects in view, the invention consists in a machine embodying the novel and improved features, constructions and combinations of parts hereinafter described and particularly pointed out in the claims, the advantages of which will be readily understood and appreciated by those skilled in the art.

This application constitutes a division of applicant's pending application Serial No. 552,656, filed September 4, 1944.

The various features of the invention will be clearly understood from the accompanying drawings illustrating a machine embodying the invention in its preferred form, and the following detailed description of the construction therein shown.

Figure 2:
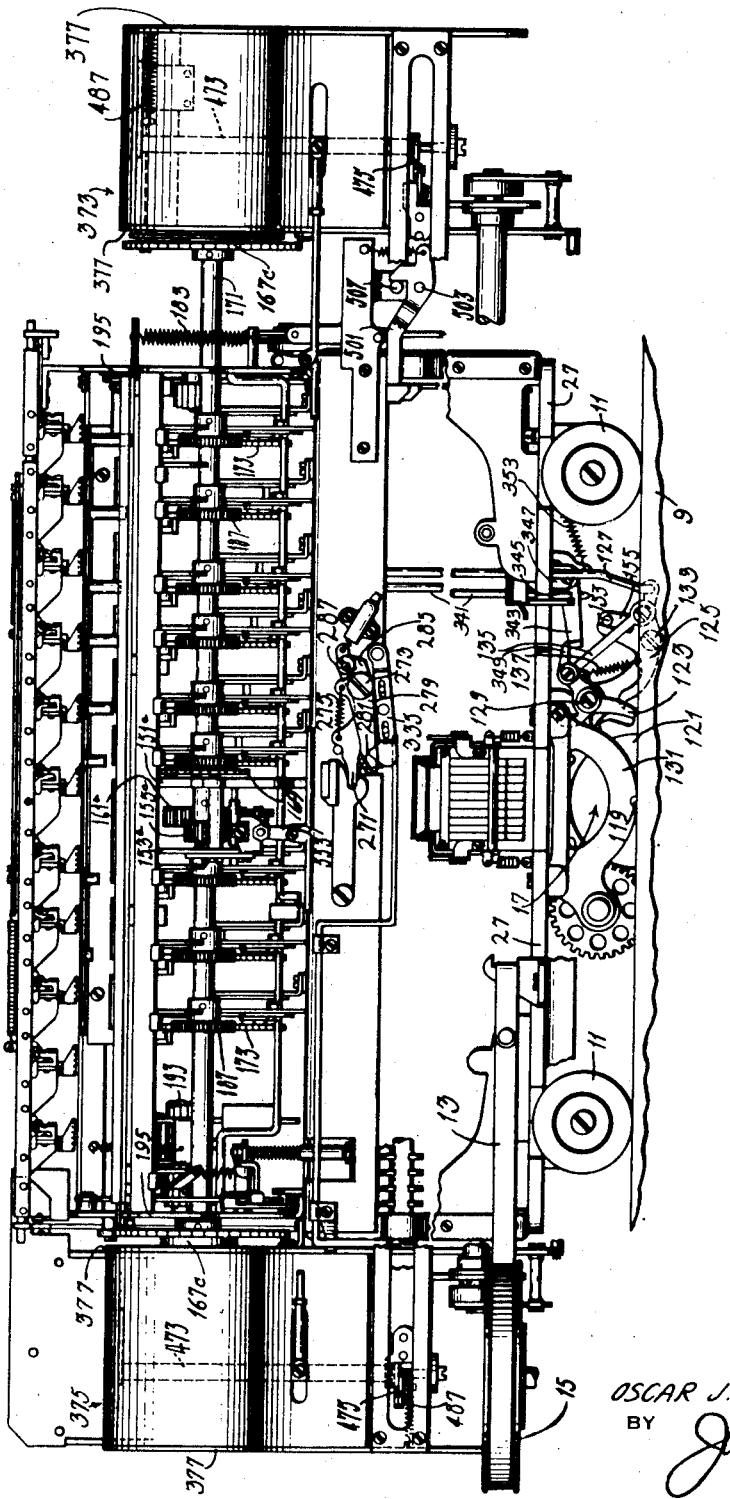
Figure 5:
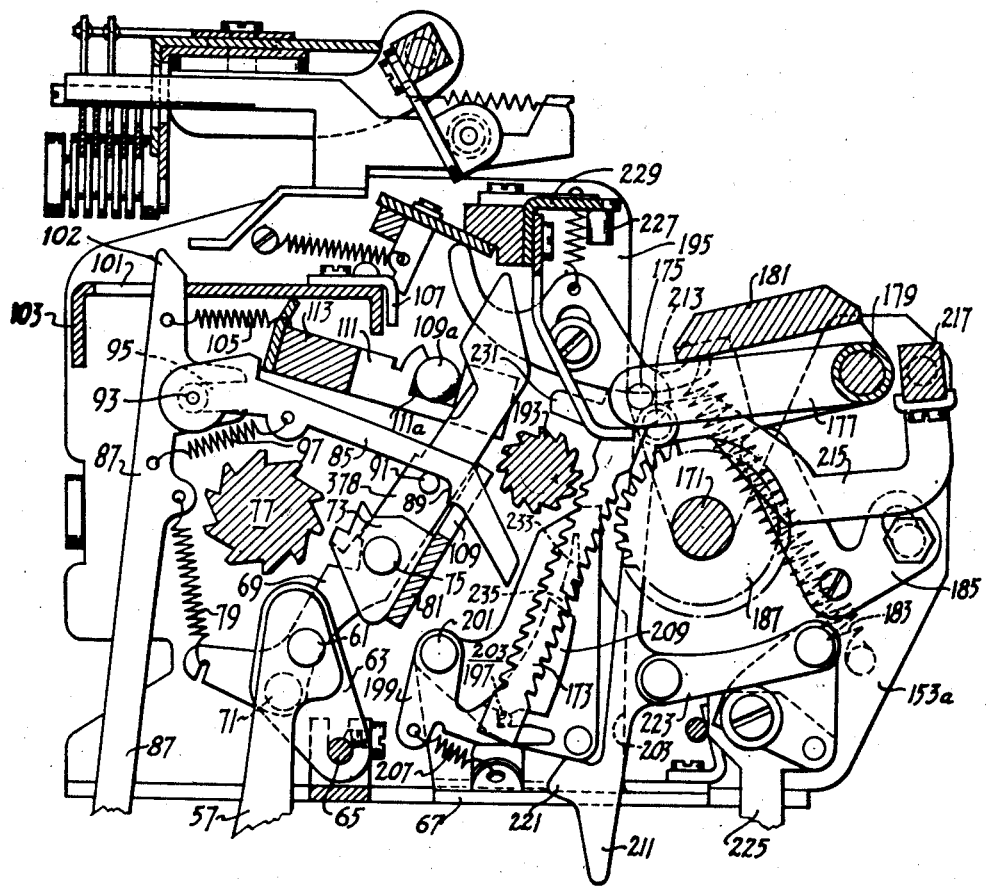
Figure 6:
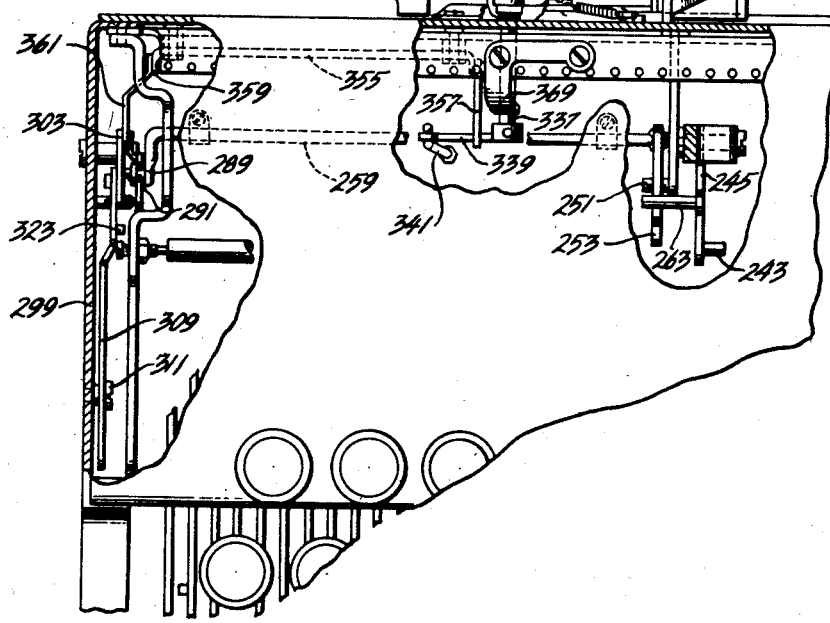
Figure 7:
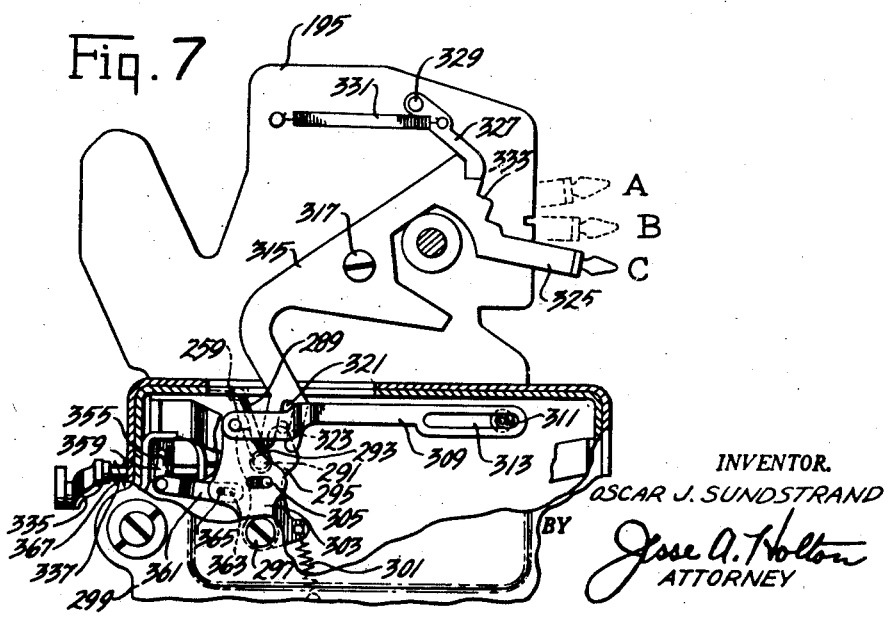
Figure 11:
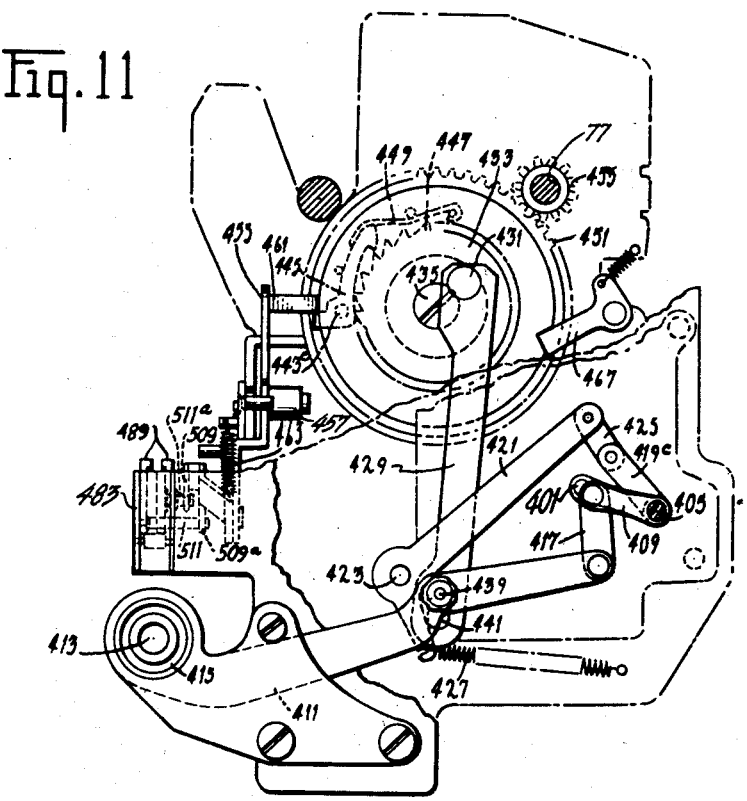
Figure 12:
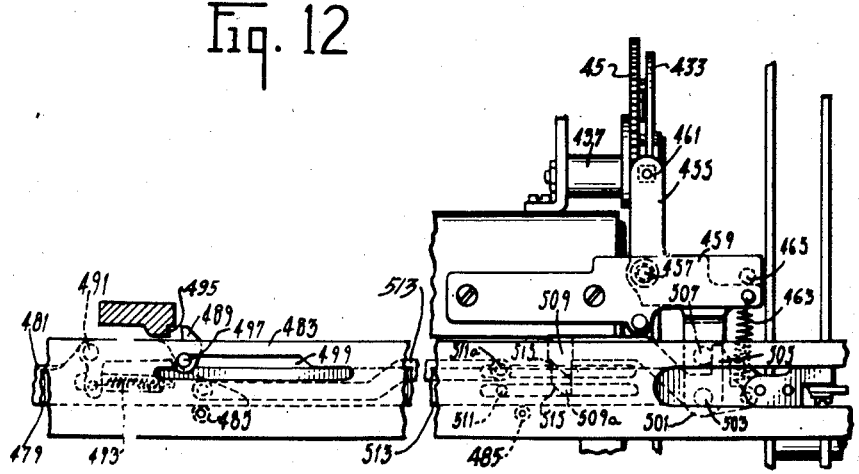
Figure 14:
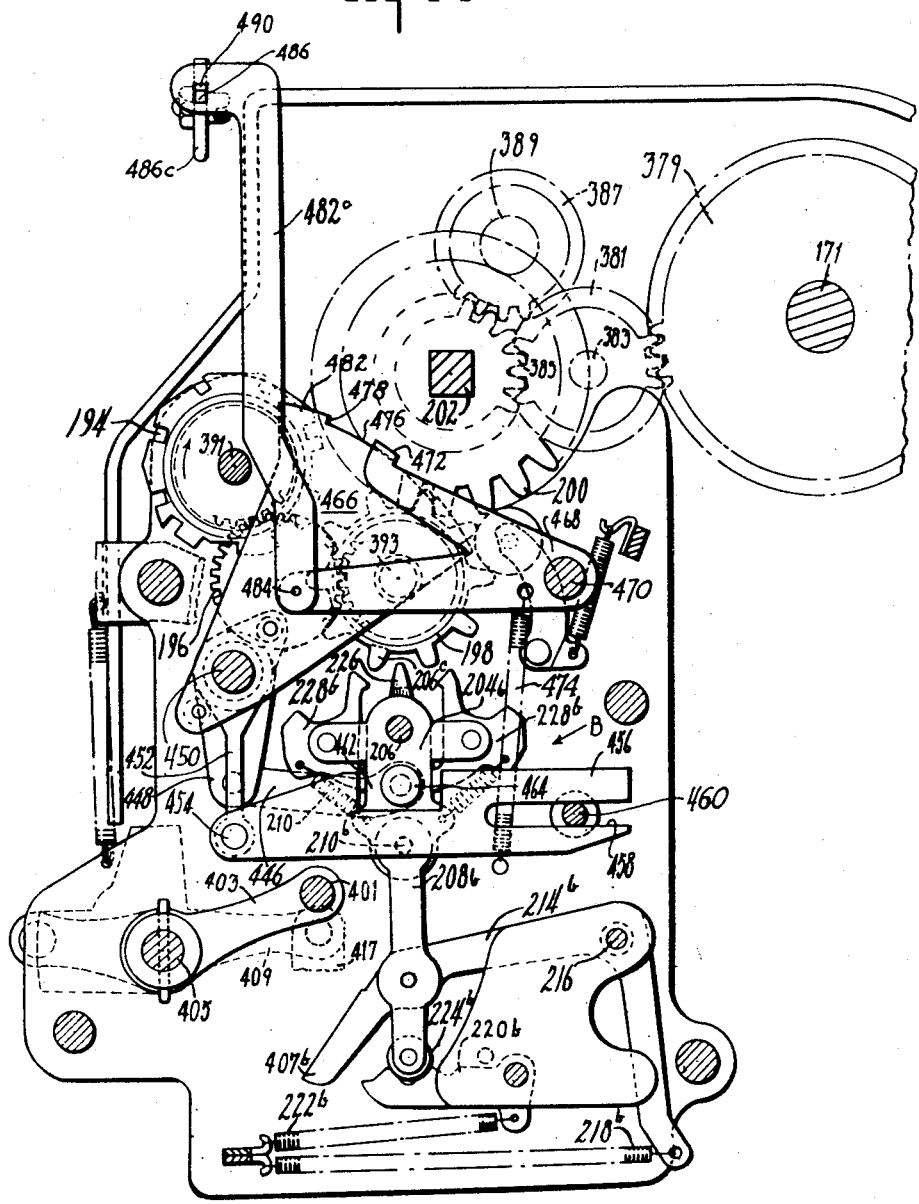

In the drawings:

Fig. 1 is a perspective view of a machine embodying the invention, showing the mechanism more directly concerned in the invention in full lines, and the remainder of the machine in dot-and-dash lines, Fig. 2 is a view in rear elevation illustrating particularly the type head or carriage of the machine, Fig. 3 is a view in vertical section of the machine illustrating particularly the type bar and differential actuator mechanisms, Fig. 4 is a detail view in rear elevation illustrating the driving mechanism for the master wheel for operating the column registers, Fig. 5 is a view similar to Fig. 3 illustrating a portion of the mechanism shown in Fig. 3 on an enlarged scale, Fig. 6 is a detail plan view illustrating the mechanism for rendering the differential mechanism operative when the carriage is in the zone of a column register and the decimal space or trip mechanism, Fig. 7 is a view in side elevation illustrating particularly certain parts of the mechanisms shown in Fig. 6, and certain associated parts, Fig. 8 is a detail view in vertical section illustrating particularly the mechanism for rendering the differential mechanism operative when the carriage is in the zone of a register, Fig. 9 is a view in rear elevation illustrating the driving means for one of the cross-computing registers and the mechanism for controlling the state of said driving means, as to addition or subtraction, from the subtract key and from an automatically acting subtract cam, Fig. 10 is a plan view of a portion of the machine and illustrating particularly one of the cross-computing register mechanisms, Fig. 11 is a detail view in side elevation illustrating particularly the transfer reset mechanism for one of the cross-computing registers, Fig. 12 is a view in rear elevation showing certain parts of the mechanism illustrated in Fig. 11 and certain asosciated parts, Fig. 13 is a detail perspective view illustrating particularly certain parts of the "fugitive one" mechanism, Fig. 14 is a view in side elevation illustrating the right-hand cross-computing register and the "fugitive one" mechanism for said register, Fig. 15 is a view in side elevation illustrating a portion of the mechanism shown in Fig. 14 with certain of the parts in different positions, Fig. 16 is a view in side elevation illustrating a portion of the mechanism shown in Fig. 14 with certain of the parts in still different positions, Fig. 17 is a view in side elevation illustrating a portion of the mechanism shown in Fig. 14 with certain of the parts in still different positions, Fig. 18 is a detail view in side elevation illustrating the regular two-way transfer mechanism of the crossfooter, and Fig. 19 is a view in side elevation illustrating the driving mechanism for the machine.

The invention is illustrated and described in this application as applied to a combined typewriter and accounting machine of the Elliott Fisher type, the typewriting and accounting mechanisms of which have substantially the same construction, arrangement and mode of operation of parts as the corresponding mechanisms in the machine illustrated and described in applicant's Patent No. 2,370,505, dated February 27, 1945. As shown and described in said patent, the type bar mechanisms and the differential actuating mechanisms are operated by power from a suitable motor.

In the illustrated construction, the machine comprises a platen frame, one of the side rails of which is indicated at 1, Fig. 3, a substantially flat platen 3 mounted for vertical movement in said frame, a line space frame, a portion of which is indicated at 5 mounted for forward and rearward movement on said platen frame and mechanisms for imparting a line spacing movement to the line space frame at the end of each return movement of the carriage, all as shown and described in said patent.

Upon the line space frame is supported a type carriage or head indicated as a whole at 7 upon which is mounted the usual series of type bars each carrying one or more types for engaging the work sheets supported on the platen. The type bars are arranged to be operated by power driven mechanism in the present machine, and this mechanism, in part, is carried by the carriage. The carriage also carries the usual series of keys forming the keyboard of the machine and controlling the coaction of the type bars with the power driven mechanism. The carriage also carries a master wheel by which the totalizers or registers are driven and mechanism for driving the master wheel differentially by power to set up or enter successively the various digits of a number step by step in a register.

The type carriage is mounted for movement forwardly and rearwardly with the line space frame and is also mounted for lateral movement on said frame in a right-hand direction to letter space during a typing operation and for return movement in a left-hand direction to restore the carriage to position for starting the typing of a line. The carriage is provided with front and rear wheels or rollers (see Figs. 2 and 3) arranged to engage, respectively, the front and rear rails of the line space frame of which the rollers engaging the rear rail 9 are indicated at 11. The carriage is acted upon by the usual metallic band 13 having one end attached to the carriage and connected with the usual spring drum 15 which tends yieldingly to move the carriage constantly in a right-hand direction along the rails of the line space frame, as shown in said patent. The letter spacing movement of the carriage is controlled by the usual escapement mechanism, indicated as a whole at 17, this escapement mechanism preferably having substantially the same construction, arrangement and mode of operation of parts as the escapement mechanism shown and described in the patent to Foothorap, No. 1,203,519, dated October 31, 1916.

TYPE ACTION (See Fig. 3)

The present machine is provided with a series of type bars 19 each pivoted at 21 to a hanger 23 secured to the semicircular type bar ring 25 suspended below the deck 27 of the carriage. The type bars are, respectively, acted upon by coil springs 29 which operate to retract the bars and tend to retain them in their normal positions in engagement with a semicircular buffer ring 31.

The tail of each of the type bars is connected by a link 33 with an elbow lever 35 pivoted at 37 upon a hanger 39 depending from the deck 27. Each elbow lever is connected by a link 41 with the forward end of a sub-lever 43 pivoted at 45 upon a support 47 secured to the upper face of the deck 27. The rear end of the sub-lever 43 is connected by a link or push rod 49 with a horizontally arranged intermediate lever 51 pivoted on a fulcrum bar 53 extending across the rear of the key carriage. Each of the intermediate levers 51 is acted upon by a coil spring 55 which assists the retracting spring 29 in yieldingly holding the parts of the mechanism in the normal positions shown in Fig. 3.

POWER DRIVEN TYPE BAR ACTUATING MECHANISM (See Figs. 3 and 5)

In the present machine, power driven mechanism is provided for swinging the intermediate levers 51 in a downward direction about the fulcrum bar 53 to actuate the type bars. This mechanism comprises a transmitting link 57 pivotally connected to the intermediate lever 51 by means of a stud 59. The transmitting link is pivoted at 61 to a radius arm or lever 63 which is journaled on a rod 65 extending longitudinally of the type carriage and supported on the cover plate 67. Said mechanism also comprises a driving link 69, the lower end of which is pivoted at 71 to the radius arm 63. A pawl 73 is pivoted at 75 to the driving link and is provided with two teeth arranged to engage the teeth of a continuously rotating toothed or fluted shaft 77 mounted in bearings in the type carriage. The lower end of the driving link is acted upon by a coil spring 79 which tends to swing the link in a clockwise direction about the pivot 71 and to normally maintain the link substantially in the position shown in Fig. 5 with the pawl 73 in engagement with a fixed inclined arresting plate 81 extending across the type carriage, in which position the pawl is disengaged from the toothed shaft. In order to engage the pawl with the shaft, the driving link 69 is swung to the left (Figs. 3 and 5) about the pivot 71. The shaft 77 is continuously driven by power through suitable driving connections from a motor 83 as shown and described in said Patent No. 2,370,505. Upon the engagement of the pawl with the shaft and the turning of the pawl 73 about the pivot 75 to its limiting position, the driving link 69 is driven in a downward direction to actuate the transmitting link 57 and the intermediate lever 51 downwardly.

The driving links are swung to the left to engage the respective pawl carried thereby with the toothed shaft by mechanism actuated by the keys of the keyboard. This mechanism comprises a drag link 85 connected at its left-hand end (Fig. 3) with an upwardly extending arm of the key lever 87 and having a shoulder 89 adjacent its right-hand end arranged to engage a pin 91 mounted on the driving link 69. The left-hand end of the drag link is connected with the upwardly extending arm of the key lever 87 by means of a stud 93 mounted on the link and engaging in a slot 95 in said arm of the key lever and a coil spring 97 which normally holds the stud 93 seated in the left-hand end of the slot. Each of the key levers 87 is pivoted on a shaft 91a common to the keys of all the banks and is provided with a forwardly extending arm on which is fixed a key 99. The end of the upwardly extending arm of each of the key levers extends through a guide slot 101 formed in a guide plate 103 secured to the upper portion of the frame of the type carriage and the movement of the key lever is limited by the engagement of said arm with the ends of the guide slot. Each of the key levers is acted upon by a coil spring 105 which normally maintains the upwardly extending arm thereof in engagement with the rear end of the guide slot.

With this construction, upon the depression of the key 99 of the key lever, the upwardly extending arm thereof will be swung forwardly or to the left (Fig. 3) to engage the pawl 73 with the toothed shaft 77.

When the key is depressed to actuate the key lever to swing the driving link to the left to engage the pawl with the toothed shaft, the movement of the driving link is limited by the engagement of the pawl with said shaft. As the driving link is carried downwardly by the rotary movement of the shaft, the link is swung to the left during the latter part of its movement by the engagement of the pawl contacting tooth of the shaft with the upper tooth of the pawl, the movement of said tooth of the shaft then having a substantial component toward the left (Fig. 3). In order to limit this swinging movement of the driving link and cause the disengagement of the pawl from the tooth of the shaft at the desired time in the actuation of the type bar mechanism, a series of stop plates 107 are adjustably mounted on the guide plate 103 and are arranged to be engaged, respectively, by the upper ends of the driving links to limit the swinging movement thereof.

The free rear ends of the drag links 85 project through guide slots 109 formed in the upper portion of the arresting plate 81. The bottom walls of these slots limit the downward movement of the drag links under the influence of the springs 97 as the driving links move downwardly to actuate the type bars.

The trailing ends of the driving links 69 travel up and down and move forwardly and rearwardly in guide slots 111 formed in a transverse bar 113 supported on the frame of the type carriage.

INTERLOCK FOR DRIVING LINKS (See Fig. 5)

An interlock mechanism is provided for preventing more than one of the driving links from being swung forwardly into operating position at the same time. This mechanism comprises a series of interlocking balls 109a confined in a channel 111a formed in the bar 113 as shown and described in said Patent No. 2,370,505.

ESCAPEMENT MECHANISM (See Figs. 2 and 3)

The present machine, as stated above, is provided with an escapement mechanism for controlling the letter spacing movement of the type carriage, and has substantially the same construction, arrangement and mode of operation of parts as the corresponding mechanism illustrated and described in the patent to Foothorap, No. 1,203,519. This escapement mechanism comprises a carriage feed rack 115 (see Fig. 3) secured to the rear rail 9 of the line space frame and a feed pinion 117 journaled on a shaft 119 having its ends engaged in suitable supports on the frame of the type carriage. To this pinion is secured an escapement wheel 121 controlled by escapement dogs 123 and 125 arranged to engage said wheel and operated from the universal bar by means of the usual draw wire 127. The holding dog 123 is pivoted at 129 on the bracket 131 suspended from the deck 27, the spacing dog 125 is pivoted at 133 on said bracket and said dogs are connected by a link 135 and by an operating spring 137 as fully shown and described in said patent. The draw wire 127 is connected at its upper end with an arm 139 (see Fig. 3) secured to a rock shaft 141 arranged transversely of the type carriage. Arms 143 are secured to this rock shaft from which is suspended a universal bar 145. This bar extends beneath the several intermediate levers 51 and is arranged to be engaged by an abutment screw 147 mounted in each of said levers. The depression of the universal bar 145 by the downward movement of any one of the intermediate levers 51 swings the rock shaft 141 in a counterclockwise direction (Fig. 3) thereby swinging upwardly the arm 139 to swing the holding dog 123 out of operative position and to swing the spacing dog 125 into operative position. The rock shaft is returned to normal position by a return spring 149 connected to a depending arm 151 on the shaft. Return movement of the rock shaft swings the arm 139 downwardly and releases the draw wire 127, permitting spring 137 to move the spacing dog 125 out of operative position and the holding dog 123 back into operative position. An arm on the spacing dog 125 engages a pin 153 mounted in a fixed arm 155 to limit the movement of the dog.

The escapement mechanism is controlled from the space bar by mechanism having substantially the same construction, arrangement and mode of operation of parts as the corresponding mechanism illustrated and described in applicant's Patent No. 2,239,023, dated April 22, 1941. This mechanism comprises devices operated by power for swinging the rock shaft 141 in a counterclockwise direction (Fig. 3) to throw out the holding dog 123 and to throw in the spacing dog 125, and the parts are restored to their normal positions by the action of the restoring springs 137 and 149.

REGISTER AND DIFFERENTIAL ACTUATOR MECHANISMS (See Figs. 3 and 5)

The machine illustrated is provided with a series of registers 163 mounted at the rear of the machine upon a register bar 165 fixed to the line space frame, said registers being provided with totalizer wheels 167, 167a and 167b. The type carriage is provided with power-driven mechanism for actuating the totalizer wheels of the column registers to set up numbers in said wheels. This mechanism is controlled by the numeral keys of the typewriter keyboard. This mechanism comprises a master wheel 169 (Fig. 3) located at about the middle of the type carriage at the rear thereof and extending rearwardly from the carriage into position to engage the lowest set of wheels of the totalizer mechanism. The master wheel is fixed to a shaft journaled in the carriage and is connected by suitable gearing with the main differential actuator shaft 171 extending across the type carriage and journaled in suitable bearings 167c (Fig. 2) supported on the frame of the carriage.

The shaft 171 is rotated differentially to impart differential movements to the master wheel 169 and to the totalizer wheels of a register to enter the desired numbers in the register by differential mechanisms selectively controlled from the several numeral keys of the type bar mechanisms. These differential mechanisms are thrown into operation by the corresponding numeral type bar actuating mechanisms. The said differential mechanisms have substantially the same construction, arrangement and mode of operation as the corresponding mechanisms shown and described in applicant's Patent No. 2,370,505. The several mechanisms for differentially rotating the shaft 171 under control of the numeral keys for the numbers from "3" to "9", inclusive, to enter corresponding numbers in the register, all have the same general construction, arrangement and mode of operation of parts, these mechanisms differing only in the respects hereinafter pointed out to vary the rotative movement imparted to the shaft.

Each of these mechanisms (see Figs. 3 and 5) comprises a rack bar 173, pivotally suspended at 175 on an arm 177 which is pivoted on a shaft 179 extending across the type carriage. These arms are acted upon by a bail 181 also pivoted on said shaft and normally held yieldingly in depressed position by a spring 183, the bail engaging the upper sides of the arms as shown in Fig. 5. The downward movement of the bail is limited by an adjustable stop lever 185 such as shown in said application Serial No. 552,656.

Each of the racks 173 is provided, on the rear side thereof, with a series of downwardly inclined teeth arranged to engage the teeth of a gear 187, fixed to the shaft 171, the teeth of gear 187 being inclined in a clockwise direction, Figs. 3 and 5. The shaft 171 is connected with the master wheel 169 to drive the same by suitable gearing hereinafter described. Each of the rack bars is also provided on its forward side with a series of downwardly inclined teeth arranged to engage the teeth of a continuously rotating power driven toothed or fluted shaft 193 extending across the type carriage and journaled in bearings carried by the side plates 195.

Each of the rack bars is normally held in a position intermediate the shaft 193 and the corresponding gear 187, as shown in Fig. 5, in which it is disengaged from both shaft and gear. The mechanism for holding each rack in this position comprises a pin 197 secured in the bar adjacent the lower end thereof and engaging in a recess in a lever 199 pivoted at 201 on an upright supporting plate or bracket 203 secured to the cover plate 67. This lever is acted upon by a coil spring 207 which tends to swing the lever upwardly, and yieldingly holds the pin in the recess. In this position the pin 197 lies below the lower edge of a fixed cam plate 209 attached to the upright plate 203.

In order to throw into operation the differential mechanism for entering a given digit in the totalizer wheels of a register, the rack bar 173 corresponding to this digit is swung forwardly to engage the teeth on the forward side of the rack bar with the teeth of the continuously rotating shaft 193. The rotation of shaft 193 then moves rack bar 173, arm 177 and the bail 181 upwardly against the tension of the spring 183. When the rack bar has been moved upward the distance required for the subsequent action thereof, it is swung rearwardly to disengage the teeth on the forward side thereof from the shaft 193, this movement being limited to prevent the engagement of the teeth on the rear side thereof at this time with the gear 187. The rack bar is then moved downward by the action of the bail 181. At a predetermined point in the downward movement of the rack bar, the bar is swung farther to the rear to engage the teeth on the rear side of the bar with the gear 187, and during the continued downward movement of the bar, the gear is rotated to actuate the totalizer wheels to enter the corresponding digit in the register.

The several mechanisms for swinging the rack bars forwardly to engage said bars with the continuously rotating shaft 193 are operated from the several corresponding intermediate levers 51 connected with the numeral type bars as these levers are moved downwardly to actuate the type bars corresponding to the numeral keys. These mechanisms, however, are rendered operative only when the master wheel 169 is in position to engage and actuate one of the wheels of a register. The position of the type carriage when the master wheel is in position to operate the totalizer wheels of a register will be, in certain instances, hereinafter referred to as the position of the carriage when in the zone of a register.

The mechanism for swinging each of the rack bars forwardly comprises a lever 211 (one for each rack bar) pivotally suspended at 213 upon an arm 215 secured to a rock shaft 217 extending across the type carriage and supported in bearings in the end plates thereof. The lever 211 projects at its lower end through a guide slot in the cover plate 67 and is formed on its left-hand side with a projection 221 arranged to engage the pin 197. The rock shaft 217 is acted upon by a coil spring attached to an arm on said shaft (not shown) which normally maintains the arm 215 and the lever 211 in lowered position with the projection 221 below the pin 197. The lever 211 is connected by a link 223 with a plate fixed to the upper end of an arm 225 secured to one of the intermediate levers 51.

The levers 211, when the carriage is not in the zone of a register, occupy their lowered positions as shown in Fig. 5. The machine is provided with the usual state control device and register engaging cam mechanism for controlling the actuation of the totalizer wheels of a register from the differential mechanism when in the zone of a register, both of which are shown and described in applicant's Patent No. 2,370,505. With the state control device adjusted in "write" or "total" positions, the levers 211 will occupy their normal lowered positions, when the carriage is in the zone of a register. With the state control device adjusted in "compute" position, when the carriage is in the zone of a register, the levers 211 assume elevated positions to locate the projections 221 opposite the pins 197.

With this construction, when the lever 51 of a numeral type bar mechanism is swung downwardly to actuate the type bar, the corresponding lever 211 is swung forwardly through its connection with the arm 225. If the lever 211 is, at this time, in lowered position, the projection 221 thereon will not engage the pin 197 and this movement of the lever 211 will not affect the position of the rack bar. However, if the lever 211 is then in elevated position, the projection 221 on the lever will engage the pin 197 on the rack bar, as said lever is swung forwardly, and the rack bar will be swung forwardly therewith to engage the same with the continuously rotating shaft 193.

When the rack bar is engaged with the shaft 193, the bar is moved upwardly by the action of the shaft for the distance required for its subsequent action and is then swung rearwardly to disengage the same from the shaft by means of a pin 227 projecting downwardly from a supporting plate 229 secured to the frame of the carriage, which pin engages a laterally projecting arm 231 on the rack bar.

During the lateral swinging movement of the rack bar forwardly to engage the same with the shaft 193, the pin 197 travels along the lower edge of the fixed cam plate 209, and then passes beyond said edge to locate the same forwardly of the plate. The upward movement of the rack bar produced by its engagement with the shaft 193 then carries the pin in front of the cam plate. During the upward movement of the rack bar, the pin travels along the forward edge of the cam plate which is shaped as shown in Fig. 5 and tends to guide the lower end of the rack bar and prevent it from disengaging the continuously rotating shaft. As the rack bar approaches the upper end of its movement, the upward movement of the rack carries the pin 197 beyond the upper end of the cam plate so that the pin leaves the forward edge of the cam plate and the rack bar is free to swing rearwardly. As the rack bar is swung rearwardly by the action of the pin 227, the pin 197 engages the forward side of a fixed guide plate 233 (see Fig. 5) secured to the upright supporting plate 203 above the cam plate 209 and arranged to leave a crossover or channel 235 between the lower edge of the same and the upper edge of said cam plate. This plate 233 limits the rearward movement of the rack bar to prevent, at that time in the cycle, the engagement of the rack with the gear 187, and forms a guide for the lower end thereof during the first part of the downward movement of the bar.

During the first part of the downward movement of the rack bar, under the action of the bail 181, the pin 197 moves along the forward side of the guide plate 233 until it reaches the channel 235, the rack bar then being disengaged from the gear 187. As the pin reaches the channel, which occurs at a predetermined point in the downward movement of the rack bar, said pin is directed into said channel by the cam plate 209 which projects to the left some distance beyond the guide plate 233 as shown in Fig. 5. The channel 235 is inclined downwardly and to the right (Fig. 5) and, during the passage of the pin 197 through the same, the rack bar is swung rearwardly by the action of the cam plate 209, thereby engaging the rack bar with the gear 187 at a predetermined point in the downward movement of the rack bar.

During the continued downward movement of the bar under the action of the bail 181, the gear 187 is actuated to accumulate the number, corresponding to the numeral key depressed, in the number wheels of the column register. After the rack bar 173 is engaged with the gear 187, and the rack bar continues its downward movement, the pin 197 engages the rear edge of the cam plate 209 which forms a guide for the rack and, at substantially the end of the downward movement of the rack, the pin engages the projecting end of the lever 199. By the engagement of the pin with the lever, the lever is swung downwardly slightly and the pin is deflected forwardly into the recess in the lever by the contacting edge of the lever which is inclined to a slight degree to the direction of downward movement of the pin, thereby again locating the rack bar in its intermediate position.

The cam plate 209 and the guide plate 233 differ in size and contour for each of the several actuator racks. The position of the channel 235 or the position of the upper inclined edge of the cam plate 209 determines the point in the downward movement of the rack bar at which the rack bar is engaged with the gear 187 to actuate the totalizer wheels of a register and this determines the extent of actuation of said wheels and the number which is entered therein.

The differential mechanisms for actuating the gears 187, corresponding to the actuator racks controlled by the numeral keys for the numbers "1" and "2," differ in certain respects from the corresponding mechanisms for actuating corresponding gears 187 under control of the numeral keys for the numbers from "3" to "9," inclusive. These differential mechanisms for actuating the gears 187 to enter the numbers "1" and "2" have substantially the same construction, arrangement and mode of operation as the corresponding mechanisms illustrated and described in said Patent No. 2,370,505. In each of these latter mechanisms, each rack 173 is disengaged from the fluted shaft 193 at a predetermined point in the upward movement of the rack, differing in the case of each rack, the rack being immediately engaged with the corresponding gear 187 and the gear being actuated at the beginning of the downward movement of the rack. Thus, the differential movement of the respective racks is produced by disengaging the racks from the fluted shaft 193 and engaging the same with the corresponding gear 187, with the racks in differential positions. In this case also, the upward movement of the racks is produced by the rotation of the fluted shaft 193, and the downward movement is produced by the downward movement of the bail under the influence of the bail actuating spring as in the case of the racks for entering the numbers from "3" to "9," inclusive.

The master wheel 169 is located at about the middle of the type carriage at the rear thereof and extends rearwardly from the carriage into position to engage the gears 167 of the column registers. The master wheel is fixed to a short shaft 149a (see Figs. 2 and 4) journaled in bearings in brackets 151a and 153a secured to the type carriage. To the shaft is fixed a pinion 155a which is constantly in mesh with a gear 157a fixed to a shaft 159a mounted for rotative and axial sliding movements in the brackets 151a and 153a. When the mechanism is set for addition, this gear also meshes with a gear 161a attached to the main differential actuator shaft 171 extending across the type carriage and journaled in bearings 167c supported on the frame of the carriage. The gear 157a, when the machine is set for subtraction, is demeshed from the gear 161a and meshes with a gear section 169a of a twin gear 169a, 171a journaled on a shaft 173a supported in the bracket 153a. The other section 171a of said twin gear is constantly in mesh with the gear 161a and, when the machine is set for addition, the twin gear rotates idly.

The mechanism for driving continuously the fluted shafts 77 and 193 (see Fig. 19) comprises a gear 175a fixed to the shaft 77 and a gear 177a fixed to the shaft 193 and meshing with the gear 175a. To the fluted shaft 193 is attached a pulley 179a connected by a belt 181a with a pulley 183a journaled on a hollow bearing secured to a bracket 185a attached to the frame of the carriage. This pulley is provided with a square opening in which fits a square shaft 187a having bearings at its ends on the line space frame, one of which is indicated at 189a in Fig. 3, the pulley being slidable longitudinally of the shaft. Upon the shaft 187a is secured a pulley 191a connected by a belt 193a with a pulley 195a fixed to a shaft 197a mounted in bearings on the line space frame. To the shaft 197a is attached a gear 199a meshing with a gear 201a journaled on a shaft 203a secured at its ends to the line space frame. To the gear 201a is attached a pulley 205a connected by a belt 207a with a pulley 209a fixed to the shaft 211a of the motor 83.

The driving connections above described between the motor 83 and the fluted shaft 77 have substantially the same construction, arrangement and mode of operation as the driving connections between the motor and the corresponding fluted shaft shown and described in applicant's Patent No. 2,370,505, except that, in the present construction, there is no provision for driving the square shaft 187a at variable speeds from the shaft 197a. The sliding connection between the pulley 183a and the square shaft 187a maintains a driving connection between these parts while allowing the letter spacing and return movements of the carriage.

MEANS FOR ENABLING DIFFERENTIAL MECHANISM (See Figs. 2 and 8)

The mechanism for raising the levers 211 into operative position with relation to the pins 197 comprises one of the arms 215 secured to the rock shaft 217 and a link 237 pivotally suspended at 239 upon said arm. The link 237 extends through a suitable slot in the cover plate 67 and is formed at its lower end with a slot 241 in which engages a pin 243 secured in the left-hand end, Fig. 8, of a lever 245 pivoted at 247 upon a bracket depending from the cover plate. The vertical position of the lever 245 is controlled by means of a lever 249 also pivoted at 247 on said bracket and carrying a pin 251 which engages the underside of an interposer 253 lying between the lever 249 and the lever 245. The interposer 253 is pivoted at 255 to an arm 257 fixed to a rock shaft 259 supported in suitable bearings upon the underside of the cover plate 67 and is formed with a shoulder 261 upon which rests, under certain conditions, a pin 263 secured in the lever 245. Thus the interposer is supported by the lever 249 and the arm 257 and the position of the interposer longitudinally of the lever 245 is determined by the position of the arm 257 and the rock shaft 259.

The angular position of the lever 249 is controlled by the usual register engaging cam lever. This cam lever and the construction through which it is connected to the lever 249 is similar to the corresponding construction illustrated and described in the patent to Foothorap, No. 1,512,282, dated October 21, 1924. The right-hand end, Fig. 8, of the lever 249 engages in a slot 265 in a vertically movable plate or slide 267 located on the inside of the cover plate which is connected by a pin 269 with a lever 271 located on the outside of the cover plate (see Figs. 2 and 8), the pin 269 moving in a slot in the cover plate. The lever 271 is pivoted upon a stud 273 secured in a downturned portion of the cover plate and is connected by a coil spring 275 with the cam lever 279. The cam lever is also pivoted upon the stud 273 and is provided with the usual cam 281 which is engaged and depressed to depress the cam lever by a cam surface formed on the left side of a plate 283 (Figs. 3 and 8) secured to the base of the register upon the movement of the carriage into the zone of a register. The cam lever, in its downward movement, swings the lever 271 downwardly therewith by the engagement of an arm 285 (see Fig. 2) formed on the cam lever with an eccentric stop 287 secured to the lever 271. Thus, through the connections described, when the register engaging cam is depressed by the locating of the type carriage in the zone of a register, the right-hand end of the lever 249 (Fig. 8) is also depressed.

The position of the rock shaft 259 is controlled by a manually settable element for determining the condition of the machine. When the rock shaft is at this time positioned to locate the interposer 253 in the position shown in Fig. 8, the link 237 and the arm 215 will be elevated by the action of the register engaging cam lever to raise the levers 211 into operative position. When the rock shaft 259 is positioned to locate the interposer 253 in a position to the left of that shown in Fig. 8, the shoulder 261 on the interposer does not lie beneath the pin 263, and the arm 215 and link 237 will not be elevated by the movement of the lever 249.

The rock shaft 259 and arm 257 are located in the position shown in Fig. 8 to condition the machine for operation of the totalizer actuating mechanism. The rock shaft and arm are swung to the left from the position shown in Fig. 8 to disable the totalizer actuating mechanism. The mechanism for positioning the rock shaft comprises an arm 289 (see Fig. 7) extending downwardly from said shaft and carrying a pin 291 projecting laterally therefrom and engaging in a slot 293 in a lever 295 pivoted at 297 on the side plate 299 of the carriage casing. This lever is acted upon by a coil spring 301 which tends constantly to swing said lever to the right. A second lever 303 is also pivoted at 297 on said side plate and is connected with the lever 295 by means of a pin 305 secured to the lever 295 and engaging in a slot formed in the lever 303. The lever 303 is pivotally connected at its upper end to a link 309 which is supported by said lever and by a stud 311 secured in the side plate of the carriage and lying in a longitudinal slot 313 in the link. The longitudinal position of the link is controlled by means of a manually operable setting lever 315 pivoted on a stud 317 secured in the upright plate 195 at one end of the carriage and having a slot 321 at its lower end in which engages a pin 323 secured in the link 309. The lever 315 is provided with an arm 325 extending forwardly beyond the frame of the carriage by which the lever may be manually adjusted. The lever is arranged to be adjusted in three different positions to control the condition of the machine, and a detent lever 327 is pivoted at 329 on the plate 319 and is acted upon by a coil spring 331 which tends to swing the lever to engage the projection at the forward end thereof with any one of the three notches 333 to hold the lever in any one of the three positions in which it may be adjusted.

DECIMAL SPACE MECHANISM

The decimal space mechanism of the machine is similar to the corresponding mechanism illustrated and described in Patent No. 1,512,282 referred to above, many of the parts having substantially the same construction, arrangement and mode of operation. This mechanism comprises a trip lever 335 (see Figs. 6 and 7), secured to the rear end of a longitudinally movable rock shaft 337 to the forward end of which is attached an arm 339 pivotally connected to the upper end of a rod or wire 341. The lower end of this wire is pivotally connected to a lever 343 (see Fig. 2) pivoted at 345 upon a hanger 347 suspended from the deck 27, said lever being provided with a lateral projection which engages beneath the outwardly projecting arm 349 formed on the holding pawl of the escapement mechanism. When the decimal trip lever 335 is located axially in its rearward or operative position and the carriage is located so that the master wheel 169 is in the units-of-dollars position of a register and a numeral key is depressed, the V-shaped projection extending upwardly at the end of the lever is engaged by the V-shaped cam 351 (see Fig. 3) projecting downwardly from the plate 283 secured to the base of the register. By the engagement of this cam with the decimal trip lever, the lever is swung downwardly and the wire 341 is elevated to hold the escapement pawl 123 out of position to engage the escapement wheel 121, Fig. 2, until the carriage has executed a two-space or double escapement movement. This movement of the carriage disengages the projection on the decimal trip lever from the cam 351, and the parts are then restored to their normal positions by the action of the coil spring 353 on the lever 343. With the decimal trip lever located in its forward position, the V-shaped projection at the end thereof will not engage the cam 351 during the passage of the carriage through the zone of a register.

The decimal trip lever is moved axially into and out of position to be engaged by the cam 351 by longitudinal movement imparted to the rock shaft 337 upon which the lever is mounted. The mechanism for moving the shaft longitudinally comprises a rock shaft 355 (see Fig. 6) mounted in suitable bearings carried by the frame of the type carriage and having on one end a downwardly extending arm connected by a link 357 with the arm 339 on the rock shaft 337. To the other end of the rock shaft 355 is secured a second downwardly extending arm 359 which is connected with lever 303 by means of a link 361 (see Fig. 7). To provide a lost motion connection between the link and said lever, the link is formed with a slot 363 in which engages a pin 365 secured in the lever. The rock shaft 337 is acted upon by a coil spring 367 which constantly tends to move the same rearwardly to locate the decimal space lever in operative position, the rearward movement of the shaft being limited by the engagement of the hub of the arm 339 with a bracket 369 through which the shaft passes.

CROSSFOOTER REGISTER MECHANISMS

As shown clearly in Fig. 2 of the drawings, the shaft 171 is extended beyond the side plates 195 of the type carriage at each end of said carriage and right and left-hand cross-computing registers or crossfooters 373 and 375 are mounted at the respective ends of the carriage. The totalizer mechanisms of these crossfooters are connected with the ends of said shaft for operation by the shaft. The totalizer mechanisms of the crossfooters preferably are substantially identical, and each of these mechanisms has the same general construction, arrangement and mode of operation of parts as the corresponding mechanism illustrated and described in the patent to Foothorap, No. 2,145,254, dated January 31, 1939.

The mechanism for driving the totalizer of each crossfooter comprises a master wheel 200 (see Fig. 14) mounted on a shaft 202 to rotate therewith but shiftable longitudinally of the shaft to select the denomination of the totalizer mechanism corresponding with the denomination in which the master wheel 169 is located with relation to the column register. The master wheel 200 is driven by mechanism similar to that shown and described in Foothorap Patent No. 1,847,429, dated March 1, 1932, and in Foothorap Patent No. 2,032,691, dated March 3, 1936. The master wheel shaft 202 is journaled in bearings in the side plates 377 (see Fig. 2) of the crossfooter frame and is driven from the actuator shaft 171 through a gear 379 fixed to said shaft and meshing with a gear 381 journaled on and shiftable axially of the shaft 383 fixed to one of the side plates 377. When the machine is set for addition, the gear 381 is arranged to mesh with a gear 385 secured to the master wheel shaft. To set the crossfooter mechanism for subtraction, the gear 381 is shifted axially out of engagement with the gear 385 and into engagement with one section of a twin gear 387. The gear 387 is journaled on a shaft 389 secured to the adjacent side plate 377, and the other section of said gear is constantly in mesh with the gear 385, the gear 387 rotating idly when the machine is set for addition.

The value indicating wheels 194 are journaled on a shaft 391 mounted in the supporting plates 377 of the crossfooter frame and are arranged to be driven in opposite directions, respectively, for addition and subtraction by toothed denominational number wheels 198 journaled side by side on the shaft 393 supported in the crossfooter frame plates 377, said number wheels being connected with the value indicating wheels by intermediate gears 196. The master wheels of the two crossfooter registers are shifted axially step by step to the right, looking at the front of the machine, into engagement successively with the wheels 198 to select the denominations corresponding to the denominations of the column register wheels successively engaged by the master wheel 169, by mechanism described later in this application.

Each crossfooter register is provided with a two-way transfer mechanism of the type illustrated and described in Patents No. 2,032,691 and No. 2,145,254, referred to above. This mechanism (see Fig. 18) includes a series of transfer heads 204, one for each denomination except the highest, mounted to rock upon a fixed shaft 206 to either side of a central normal position. Rocking movement of a transfer head is effected initially by the engagement of a wide tooth 206c on the corresponding denominational number wheel 198 with a trip member 226 on the head arranged in the plane of said tooth to rock the head in one direction or the other at the time in the movement of said wheel at which a transfer is required. Movement of the head is continued in the direction in which it is initially rocked by actuating mechanism including a bell crank actuator lever 214 pivoted at 216 on the frame of the crossfooter, a spring 218 connected with the downwardly extending arm of the lever and urging the forwardly extending arm of the lever toward the axis of the head and a link connection 208 between the head and the latter arm of the actuator lever. The arrangement of each head and its actuating mechanism is such that, in the normal position of the parts, they assume a dead-center position providing a toggle lock resisting the action of the spring 218, in which position they are yieldingly held by a pivoted detent 220 urged by a spring 222 against a roller 224 mounted on one end of the link 208. Combined carrying fingers and locking dogs 228 tensioned by springs 210 are mounted on each head and are each provided with a projection 212 arranged in the plane of the next higher denominational number wheel 198 to impart the carrying step of movement to said wheel upon the rocking of the head.

TRANSFER RESETTING MECHANISM FOR CROSSFOOTER REGISTERS (See Figs. 11, 12, 14, 17 and 18.)

After each of the transfer heads 204 is rocked into inclined position in the manner above described, to execute a carry, the head remains in this position until it is positively restored to the normal or upright position shown in Fig. 18. The present machine is provided with mechanism which operates, immediately after the master wheel 169 leaves the units-of-cents position in a column register, to automatically restore the transfer mechanism of the crossfooter or crossfooters which may then be in operation. This mechanism (see Figs. 11, 14 and 17) comprises a rod or shaft 401 carried by spaced arms 403 secured to a rock shaft 405 mounted to turn in bearings in the crossfooter frame. In restoring the transfer mechanism, the rock shaft 405 is turned in a clockwise direction (Fig. 14) thereby swinging the rod 401 downwardly into engagement with the projecting ends 407 of any of the actuator levers 214 which may have been swung upwardly out of normal position by the rocking of a transfer head, thereby swinging the horizontally extending arms of said levers downwardly therewith. This restores the links 208 and the transfer heads to their normal positions shown in Fig. 14.

The mechanism for thus actuating the rock shaft 405 (see Fig. 11) comprises an arm 409 secured to the rock shaft, a lever 411 fixed to a rock shaft 413 mounted in bearings 415 on the frame of the carriage, and links 417 connecting the arm 409 with the lever 411. The rock shaft 405 is returned to its normal position by mechanism comprising an arm 419c secured to said rock shaft and a lever 421 pivoted at 423 on the frame of the crossfooter mechanism and connected with the arm 419c by a link 425. The lever 421 is acted upon by a coil spring 427 which constantly tends to swing the same in a counterclockwise direction (Fig. 11) and thereby to turn the rock shaft 405 in a clockwise direction.

The lever 411 is connected by a pitman 429 with a crank pin 431 fixed in a disk 433 journaled on a screw stud 435 threaded into a supporting bar or block 437 (see Fig. 12) secured to one of the side plates of the frame of the carriage, the pitman having a lost-motion connection with the lever 411 by means of a stud 439 secured in the lever and engaging in a slot 441 in the pitman. The disk 433 constitutes one element of a one-revolution clutch for actuating the pitman 429 and the arm 411. Pivoted at 443c on the disk is a pawl 445 arranged to engage the teeth of a ratchet wheel 447 journaled on the hub of the disk 433 (see Fig. 11.). The pawl is acted upon by a leaf spring 449 which tends to swing the pawl into engagement with the teeth of the ratchet wheel 447. A gear wheel 451 is fixed to the hub of the ratchet wheel 447 and is continuously driven by means of a gear wheel 453 secured on an extension on the shaft 77 projecting beyond the adjacent side plate of the carriage.

The pawl 445 is held out of engagement with the ratchet wheel 447 during the movement of the master wheel 200 past the denominational number wheels 198 of a crossfooter register, until the master wheel passes from the number wheel of the units-of-cents position, by means of a detent lever 455 pivoted at 457 on a bracket 459 (Fig. 12) attached to the frame of the carriage, which lever carries a detent stud 461 arranged to engage the tail of the pawl as shown in Fig. 11. The lever 455 is acted upon by a coil spring 463, which normally holds the lever yieldingly in position with the stud 461 in engagement with the pawl, the movement of the lever under the action of the spring being limited by means of a stop in 465. When the master wheel 200 passes from the units-of-cents position in a crossfooter register, the lever 455 is swung in a clockwise direction (Fig. 12), thereby disengaging the stud 461 from the tail of the pawl 445 to allow the same to be engaged with ratchet wheel 447 by the spring 449. Upon the engagement of the pawl with the ratchet wheel 447, the disk 433 is given a single rotation by said wheel and, during this movement of the disk, the lever 411 is swung downwardly by the pitman 429 thereby actuating the rock shaft 405 and the rod 401 to restore the transfer mechanism. Immediately after the lever 455 is actuated to cause the stud 461 to release the pawl 445, said lever is, itself, released by its actuating mechanism and, when the tail of the pawl has passed the stud, the lever is swung back to normal position by the spring 463 thereby locating the stud in the path of the tail of the pawl. As continued rotation of the disk 433 engages the tail of the pawl with the stud 461, the pawl is again disengaged from the teeth of the ratchet wheel 447, and the disk 433 comes to rest. To prevent reverse rotation of the disk 433 when the clutch is disengaged, a spring pressed dog 467 pivoted on the frame of the crossfooter is arranged to engage in a notch in said disk.

The present machine is provided with mechanism for moving the master wheel 200 of each of the crossfooter mechanisms from denomination to denomination (see Figs. 10 and 14) along the series of numeral wheels 198 during the passage of the master wheel 169 of the column register actuating mechanism through the several denominations of a column register. This mechanism has the same general construction and operation as the corresponding mechanism illustrated and described in Patent No. 2,145,254, and in part in Patent No. 2,032,691, referred to above. Each master wheel 200 is shifted by a master wheel carriage 469 movable on a guide 469a (see Fig. 10) in the direction of the axis of the wheel and connected by a link 471 to a forwardly extending crank arm 471a fixed to the upper end of a vertical rock shaft 473 mounted to turn in bearings in the crossfooter framework. A rearwardly extending arm 475 is fixed to the lower end of said shaft and is connected by a link 477a with one of a pair of longitudinally slidable coupling bars or slides 479 and 481 (see Figs. 11 and 12), one for actuating each of the master wheel carriages. These bars are mounted side by side between a pair of laterally spaced housing plates 483 secured to the frame of the type carriage and said bars slide between upper and lower series of rolls 485. The rock shafts 473 are each acted upon by a coil spring 487 connected, in one crossfooter, with the arm 471a and, in the other crossfooter, with the arm 475 which tends to swing each shaft in a direction to maintain the corresponding carriage 469 in starting position with the master wheel 200 in a position just above, or to the left of, Fig. 10, the numeral wheel 199 of the highest denomination. These springs, acting through the connecting mechanism, urge the coupling bars 479 and 481 to the left (Fig. 12). A coupling dog 489 is pivoted at 491 upon each of the coupling bars and is acted upon by a coil spring 493 which tends to swing the same upwardly into position to engage and interlock with a lug 495 on the base of each column register. A pin or stud 497 is mounted on each of the coupling dogs 489 and engages in an elongated slot 499 formed in the adjacent housing plate 483, the stud cooperating with cams formed at the opposite ends of the slot to swing the dogs downwardly out of engaging position with relation to the lug 495 on the column register.

Normally the dogs 489 lie in their upper or operative positions, one behind the other as illustrated in Figs. 11 and 12, with the pins 497 located in the left-hand portions of the corresponding slots 499 and adjacent to the respective cams at the ends of the slots (see Fig. 12). When the carriage has advanced the printing point to a position within one letter space of a columnar position on the work sheet in which a number is to be printed or a position at which the master wheel 169 of the column register actuating mechanism is one space to the left of the number wheel 197 of highest denomination of a column register, the coupling dog or dogs 489 which are in operative position will engage the lug 495 on the column register and will hold the corresponding slide or slides stationary during the continued advance of the carriage. Because of the relative movement of the carriage upon which the crossfooter mechanisms are mounted and the slides 479 and 481, the corresponding master wheel or wheels 200 will be advanced to the right from denomination to denomination across the corresponding series of numeral wheels 199. When the master wheel 169 advances one step beyond the lowest denominational order of a column register, the pin 497 on each coupling dog, which is then connected with the lug 495, engages the cam at the right-hand end of the corresponding cam slot 499 and the dog is depressed out of engagement with the lug thereby releasing the corresponding coupling slide. Each rock shaft 473 is then swung by the corresponding spring 487 in a direction to carry the master wheel 200 back to its normal or starting position and the corresponding coupling slide is moved back to the left to its starting position shown in Fig. 12.

The clutch control detent lever 455 is swung in a clockwise direction, Fig. 12, to throw the one-revolution clutch into operation to actuate the resetting mechanism for each of the crossfooters, by the retracting movement of either of the coupling slides, following the release of the coupling dog from the lug 495, under the action of either of the springs 487. The mechanism for swinging the detent lever 455 from the movement of the slides comprises a connecting lever 501 pivoted at 503 on the detent lever 455 and connected by the spring 463 which the bracket 459, this spring normally holding the connecting lever in the position shown in Fig. 12 with relation to the detent lever with a projection 505 on the connecting lever lying in engagement with a stop pin 507 fixed to the detent lever. Thus, with the levers in the relative positions shown in this figure, the spring 463 tends to swing the detent lever 455 in a counterclockwise direction. To enable the connecting lever 501 to be actuated from the coupling slides, the lever is provided with two downwardly extending projections 509 and 509a, the projection 509a being arranged in front of and extending below the projection 509, as shown clearly in Figs. 11 and 12. The projection 509a is arranged to be engaged by a connecting pin 511 secured in the slide 479 and extending forwardly therefrom through a slot in the forward housing plate 483. The projection 509 is arranged to be engaged by a connecting pin 511a fixed in a bar 513 rigidly secured to the slide 481, said pin also extending forwardly from the slide through a slot in the forward housing plate 483. The length of the pin 511a is such that it does not project forwardly far enough to engage the projection 509a, as shown in Fig. 11. In order to enable the projections 509 and 509a to by-pass the pins 511 and 511a when the coupling slides are held stationary during the advance of the carriage, each of the projections is provided with a cam face 515 arranged to engage the corresponding pin.

The above described mechanism has the following mode of operation: Referring to the mechanism controlled by the coupling slide 479, when the slide is in its normal left-hand position, with relation to the housing plates 483 as shown in Fig. 12, the connecting pin 511 is located in the position shown in this figure with relation to the projection 509a on the connecting lever 501. When the slide is held stationary by the engagement of the coupling dog 489 with the lug 495 on a column register, the connecting pin 511 is engaged with the cam 515 on the projection 509a and the laterally extending arm of the connecting lever 501 is lifted to allow the pin to pass the projection, after which the connecting lever is swung back to its normal position by the spring 463, these movements of the lever being produced without affecting the detent lever 455 which remains in its normal clutch disengaging position. When the coupling slide 479 is released by the action of the coupling dog, and the slide is moved back to the left (Fig. 12) by the slide actuating spring, the connecting pin 511 engages the right-hand side of the projection 509a, thereby swinging the detent lever 455 in a clockwise direction to disengage the stud 461 from the tail of the pawl 445 and thereby set in operation the one-revolution clutch. During this movement of the detent lever 455, the connecting lever 501 swings as a unit therewith, carrying the projection 509a upwardly until it slips off the pin 511. After the pin 511 passes beyond the connecting lever 501, the levers 455 and 501 are restored to their normal positions, as shown in Fig. 12, by the action of the spring 463 so that the stud 461 on the lever 455 will again engage the tail of the pawl 445 to disengage the clutch as the disk 433 completes a revolution.

The one-revolution clutch is tripped in the same manner by the action of the coupling slide 481, the pin 511a on this slide acting on the connecting lever 501 to swing the detent lever 455 to trip the clutch during the retracting movement of the slide.

The one-revolution clutch shown in Fig. 11 is arranged to reset the transfer mechanisms of both the crossfooters in the event that the several transfer mechanisms have been operated during the passage of the carriage through the zone of a column register. To this end, the rock shaft 413 is extended across the rear of the type carriage and one of the arms or levers 411 is attached to each end of the shaft. Mechanism connected with each of these levers having substantially the same construction as that shown in Fig. 11 is provided for restoring the transfer mechanism of each crossfooter. In the present application it has been considered necessary to show this mechanism only as applied to the right-hand crossfooter.

MECHANISM FOR SETTING THE CROSSFOOTER

*(See Fig. 9.)*

The mechanism for setting the crossfooter for addition or subtraction comprises a carriage 517 upon which is mounted the shiftable gear 381. The carriage 517 is slidably supported on a guide bar or rod 519 secured at its ends to the side plates 371 of the crossfooter frame and is provided with an arm 521 engaging in a groove in the hub of the gear 381.

The carriage 517 is moved longitudinally on the guide rod 519 by means of an arm 525 fixed to the forward end of a rock shaft 527 mounted to turn in bearings on the crossfooter frame, said arm having a pin-and-slot connection with the carriage. To the rear end of said shaft is attached an arm 529 having a pin 531 engaging in an angular slot 533 in the shifting lever 535 pivotally supported at 537 on a laterally shiftable slide 539. The slide 539 is slidably mounted on screws 541 and 543 engaging respectively in slots 545 and 547 in the slide and threaded into the crossfooter frame. Between its upper and lower ends, the shifting lever 535 is connected by a stud 549 with one end of a link 551, the other end of which is pivotally connected at 553 with a lever 553a pivoted at 555 on the frame of the type carriage. The lever 553a is connected to shift the shiftable gear for reversing the direction of rotation of the master wheel 169 for driving the column registers. The stud 549, connecting the shift lever 535 with the link 551, passes through a slot in the lever (see Fig. 9) and is supported on a swinging arm 559 pivoted at 561 on the frame of the crossfooter.

The arm 525 is shifted to shift the carriage by swinging the shift lever 535 either about the pivot 537 or about the pivot stud 549. Fig. 9 shows the parts in normal or adding positions, with the gear 381 demeshed from the twin gear 387 and in mesh with the gear 385 (see Fig. 14). The position of the lever 553a is such that the driving mechanism for driving the master wheel of the column register is adjusted to drive said wheel in a positive or adding direction. It will be noted that, as shown in Fig. 9, the position of the lever 535 is such that the pin 531 is located in the central part of the cam slot 533.

In setting the machine for subtraction by the depression of the subtract key, the lever 535 is swung to the right, Fig. 9, about the pivot 537, thereby locating the pin 531 in the left-hand portion of the cam slot 533. This movement of said cam lever, through the engagement of the pin in the cam slot, swings the arm 529, the rock shaft 527 and the arm 525 in a clockwise direction and shifts the carriage 517 and the gear 381 to the right to carry said gear out of mesh with the gear 385 and into mesh with the right-hand section of the twin gear 387.

In setting the crossfooter for subtraction automatically under control of the type carriage, the shift lever 535 is swung in a clockwise direction about the pivot stud 549 by shifting the slide 539 to the right. This movement of the lever locates the pin 531 in the right-hand portion of the cam slot 533 and, through the engagement of the pin in the slot, shifts the carriage 517 and the gear 381 to the right into mesh with the right-hand section of twin gear 387.

In setting the crossfooter for addition and the column register for subtraction, the slide 539 is shifted to the right and the stud 549 is also correspondingly shifted to the right so that the lower end of the lever 535 is maintained substantially in constant position laterally of the machine. The pin 531, the arm 529, the rock shaft 527, the arm 525, and the carriage 517 are, therefore, not shifted and the gear 381 is maintained in adding position.

The lever 553a and the lever 535 are shifted into subtract positions through a link 563, the left-hand end of which is pivotally connected with the lower end of the lever 553a. The right-hand end of the link 563 is pivotally connected with an arm 565 fixed to a rock shaft 567 mounted to turn in bearings on the type head. To this rock shaft is fixed a second arm 569 pivotally connected at 569a to the lower end of a vertically movable spring suspended link 338a hereinafter described. The link 338a is connected with the subtract key lever 573 by means of a link 571, the lower hooked end of which engages said lever as shown in Fig. 9. The upper end of the link 571 is connected with the link 338a by means of a pin 571a which engages in a slot 571b in link 338a.

The lever 535 is shifted into subtract position with the lever 553a in normal or add position by mechanism comprising a lever 575—579 pivoted on an extension of the rock shaft 527, the upper arm 579 of which has a pin-and-slot connection 581 with the slide 539. This arm is acted upon by a coiled spring 583 which tends to swing the lever in a counterclockwise direction, Fig. 9. The downwardly extending arm 575 of said lever is pivotally connected at 585 with one end of a link 587, the other end of which is connected by a pin-and-slot connection 589 and a spring link 591 with the lower end of an arm 593 of a bell crank lever pivoted at 595 on the casing plates 483 between which are mounted the bars 479 and 481 of the denominational shift mechanism of the crossfooter. The other arm 597 of said bell crank lever carries a roll 599 which is arranged to engage a cam 600 carried by the column register.

When the subtract key lever is in elevated position and the arm 597 of the bell crank lever 593—597 is depressed by the engagement of the cam 600 with the roll 599 upon the passage of the master wheel 169 into the register zone, through the connection described, the lever 535 is swung in a clockwise direction about the stud 549 thereby shifting the lower end of the lever to the left, Fig. 9, to engage the pin 531 in the right-hand portion of the cam slot 533 and shifting the carriage 517 to the right into a position in which the gear 381 is in mesh with the right-hand section of gear 387.

FUGITIVE ONE MECHANISM

*(See Figs. 13 to 18, inclusive)*

The accumulator trains of the crossfooter and the transfer mechanisms for transferring units from each of said trains below the train of highest order to a train of higher order have substantially the same construction and mode of operation as the corresponding mechanisms illustrated and described in the patents to Footherap, No. 2,032,691 and No. 2,145,254, and have been briefly described above.

In addition to the regular transfer mechanisms, the crossfooter is provided with an "extra transfer mechanism A" (Fig. 16) arranged to be actuated by the accumulator train of highest order and with an "extra transfer mechanism B" (Fig. 14) arranged to actuate the train of lowest order and controlled by the "extra transfer mechanism A." These extra transfer mechanisms have substantially the same construction and mode of operation as the regular transfer mechanisms except as hereinafter described.

The "extra transfer mechanism A" (see Fig. 16) comprises a transfer head 204a mounted to rock on shaft 206 and having a trip member 226a arranged to be engaged by a wide tooth 208c on on the number wheel 198 of the accumulator train of highest order when said train is driven from "9" to "0" in a positive direction or from "0" to "9" in a negative direction to rock said head. There are no combined carrying fingers and locking dogs pivoted on the head 204a. The "extra transfer mechanism A" further comprises a bell crank actuator lever 214a, a spring 218a, acting on said lever, a link 208a, a detent 220a, a spring 222a and a roller 224a all having substantially the same construction and arrangement as in each regular transfer mechanism. The "extra transfer mechanism B" (see Figs. 14, 15 and 17) comprises a transfer head 204b mounted on rock shaft 206 and having two carrying fingers and locking dogs 228b pivoted on said head and tensioned by springs 210b for engaging the number wheel 198 of the train of lowest denomination, but the head is provided with no trip member. The "extra transfer mechanism B" further comprises a bell crank actuator lever 214b, a spring 218b acting on said lever, a link 208b, a detent 220b, a spring 222b and a roller 224b all having substantially the same construction as in each regular transfer mechanism.

The trip member 226a of the transfer mechanism A is engaged by a wide tooth on the number wheel 198 of the accumulator train of highest order when said train is driven from "9" to "0" in a positive direction or from "0" to "9" in a negative direction to break the toggle of said transfer mechanism.

The transfer head 204a is connected by a link 446 with an arm 448 fixed to a rock shaft 450 mounted in bearings in the crossfooter frame. The arm 448 is attached to the end portion of the rock shaft 450 adjacent the transfer mechanism A, which shaft extends entirely across the crossfooter, and adjacent the opposite end of the shaft is fixed an arm 452, the lower end of which is pivotally connected at 454 to the forward end of a control slide or bar 456, the rear end of which is formed with a slot 458 in which slidably engages a screw stud 460 threaded into the frame of the crossfooter to support said bar. The bar 456 is formed with a second slot 462 which receives a roll 464 mounted on the transfer head 204b below the pivot 206. The bar 456 and the transfer head 204b are normally located and held in positions such that the roll 464 is located centrally in the slot 462, as shown in Fig. 14. The slot 462 is considerably wider than the diameter of the roll 464 allowing the transfer head to rock to a predetermined position before the roll engages an end wall of the slot. The longitudinal position of the bar 456 is controlled from the transfer head 204a of the transfer mechanism A through the link 446, arm 448, rock shaft 450 and arm 452.

The movement of the rock shaft 450, under certain conditions, is limited by a latch mechanism comprising a sector plate 466 fixed to the rock shaft and a bell crank lever 468 pivoted at 470 on the frame of the crossfooter, one arm of which is formed with a laterally bent end 472 constituting a latch arranged to engage the edge of said sector plate.

The lever 468 is acted upon by a coiled spring 474 which tends constantly to swing the same downwardly and to maintain the latch portion 472 in engagement with the outer edge of the sector plate. The outer edge of said plate is formed with a central arcuate portion 476, with shoulders 478 and 480 at the opposite ends of said arcuate portion and with arcuate portions 482 outside the arcuate portion 476 and having slightly greater radii than the portion 476.

Normally the parts of the transfer mechanism A are located in positions such that the toggle formed by the head 204a and the link 208a is in a straightened condition and the latch portion 472 of lever 468 engages the central portion of the arcuate edge 476 of the sector plate 466, as shown in Fig. 14. When the transfer head 204a is rocked by the engagement of a wide tooth on the number wheel 198 of the accumulator train of the highest order, the rock shaft 450 and the sector plate 466 are turned in one direction or the other by the movement of said head and the breaking of the toggle is limited by the engagement of the latch 472 on the lever 468 with one of the shoulders 478—480 on the sector plate 466 (see Figs. 15 and 16) which limits the rocking of sector plate 466, rock shaft 450 and arm 448, and thereby, through the link 446, limits the rocking of the transfer head.

The lever 468 is actuated to lift the latch 472 and release the sector plate 466 by mechanism comprising a link 482c pivotally connected at its lower end as at 484 with an arm on the lever 468 and a bell crank lever 486—486c (Figs. 1, 13 and 14) pivoted at 488 on the crossfooter frame and having an arm 486 arranged to engage in a slot 490 in the link 482c. The bell crank lever 486—486c is formed with a second arm 486c arranged to be engaged by the master wheel carriage 469 as said carriage is moved to carry the master wheel into sub-units position. The movement of the bell crank lever 486—486c thus imparted by the master wheel carriage at this time lifts the link 482c and the lever 468 to release the segment plate 466. Upon the release of the segment plate, the toggle of the A transfer mechanism is completely broken by the action of the spring 218a.

The above described mechanism has the following mode of operation, starting with the parts in the normal positions, as shown in Fig. 14.

When the accumulator train of highest order is turned from a positive condition in a negative direction from "0" to "9," the transfer head 204a is rocked by the engagement of a wide tooth on the number wheel 198 of the accumulator train of the highest order substantially into the position shown in Fig. 16. During this movement of the transfer head, the rock shaft 450 and the sector plate 466 are rocked in a clockwise direction until the movement of the sector plate is limited by the engagement of the shoulder 478 on said plate with the latch 472 on the lever 468. The engagement of the latch with this shoulder limits the breaking movement of the toggle formed by the head 204a and the link 208a. The turning movement of the rock shaft 450 moves the bar 456 forwardly until the rear face of the slot 462 is substantially in engagement with the roll 464 on the transfer head 204b which has remained in the position shown in Figs. 14 and 15. The parts remain in this condition during the passage of the master wheel along the accumulator trains of the several denominations of the crossfooter until said wheel passes from the train of lowest order to a position below said train. As the master wheel moves from the train of lowest order to a position below said train, the bell crank lever 486—486c is actuated by the master wheel carriage to lift the lever 468 and thereby release the sector plate 466. Upon the release of the sector plate, the spring 218a completes the breaking of the toggle 204a—208a and during this final breaking movement of the toggle, the rock shaft 450 is turned farther in a clockwise direction and the bar 456 is moved farther forwardly thereby, through the engagement of the rear face of the slot 462 with the roll 464, rocking the transfer head 204b of the transfer mechanism B and breaking the toggle formed by said head and the link 208b. Upon the breaking of said toggle the spring 218b brings the parts of the transfer mechanism B finally to the positions shown in Fig. 17. During this movement of the transfer mechanism B, the left-hand dog 228b, Figs. 14, 15 and 17, engages a tooth of the number wheel 198 of the accumulator train of lowest order and turns said wheel a distance of one unit in a negative direction. The action of the transfer restoring mechanism resets, in normal position, the parts of the transfer mechanisms A and B and also the sector plate 466 and the control bar or slide 456. As the master wheel carriage is returned to its normal left-hand position, the bell crank lever 486—486c is released by the master wheel carriage and the spring 474 depresses the lever 468 to engage the latch portion 472 of said lever with the arcuate edge 476 of the sector plate.

In turning the accumulator train of highest order from a negative condition in a positive direction from "9" to "0," the "fugitive one mechanism" shown in Figs. 14 to 18, inclusive, has a mode of operation similar to that described above. In this case, the transfer head 204a of the transfer mechanism A is rocked in the opposite direction by the engagement of a wide tooth on the number wheel 198 of the accumulator train of highest order with the trip finger 226a and the toggle of said transfer mechanism is broken in the opposite direction. The rocking of the transfer head 204a turns the rock shaft 450 and the sector plate 466 in a counterclockwise direction, Figs. 14 to 18, inclusive, and the breaking movement of the toggle is arrested by the engagement of the shoulder 480 on said sector plate with the latch portion 472 of lever 468. The counterclockwise movement of the rock shaft 450 moves the control bar 456 rearwardly until the rear face of the slot 462 is substantially engaged with the roll 464. The toggle of the transfer mechanism B, however, remains in an unbroken condition until after the completion of the entering of numbers in the crossfooter. Upon the passage of the master wheel from the accumulator train of lowest order of the crossfooter to a position below said train, the bell crank lever 486—486c is actuated by the master wheel carriage to lift the lever 468 and thereby releases the sector plate 466. When the sector plate is released, the toggle of the transfer mechanism A is completely broken by the action of the spring 218a, the transfer head 204b is rocked in a counterclockwise direction by the further rearward movement of the bar 456 and the toggle of the transfer mechanism B is initially broken in a direction opposite to that in which it was broken in the operation previously described. The latter toggle is then completely broken by the action of the spring 218b. During this movement of the toggle, the right-hand carrying and locking dog 228b, Figs. 14, 15 and 17, engages a tooth of the number wheel 198 of units order and turns said wheel in a positive direction a distance of one unit.

It is to be understood that the construction illustrated and described in this application is merely illustrative of the invention and that the invention is not limited to the particular form thereof herein disclosed but that the invention may be embodied in other forms within the scope of the claims.

Having explained the nature and object of the invention and having specifically described a machine embodying the invention in its preferred form, what is claimed is:

1. A typewriting and accounting machine comprising power means, a platen, type bar mechanisms for successively typing characters on a work sheet supported on the platen, a totalizer comprising a series of accumulator trains, a master wheel for successively engaging said trains to enter numbers, digit by digit, in the totalizer, a fugitive unit transfer mechanism controlled by the train of highest denomination when the number wheel of said denomination is rotated from "0" to "9" or from "9" to "0" for operating the train of lowest order to enter a unit therein, means operating when the number wheel of the highest denomination is rotated from "0" to "9" or from "9" to "0" for tripping the transfer mechanism for operation, a catch for preventing the transfer mechanism from operating completely at that time, and means for releasing the catch upon the passage of the master wheel from units toward sub-units position of the totalizer to allow the transfer mechanism to operate.

2. A typewriting and accounting machine comprising power means, a platen, type bar mechanisms for successively typing characters on a work sheet supported on the platen, a totalizer comprising a series of accumulator trains, a master wheel for successively engaging said trains to enter numbers, digit by digit, in the totalizer, a fugitive unit transfer mechanism controlled by the train of highest denomination when the number wheel of said denomination is rotated from "0" to "9" or from "9" to "0" for operating the train of lowest order to enter a unit therein, means operating when the number wheel of the highest denomination is rotated from "0" to "9" or from "9" to "0" for tripping the transfer mechanism for operation, a catch for preventing the transfer mechanism from completely operating when tripped, means for releasing the catch upon the passage of the master wheel from units toward sub-units position of the totalizer, and a spring means to complete the operation of the transfer mechanism.

3. A typewriting and accounting machine comprising power means, a platen, type bar mechanisms for successively typing characters on a work sheet supported on the platen, a totalizer, means for entering numbers, digit by digit, in the totalizer, a toggle, means operated by the train of highest order when said train is actuated from "0" to "9" or from "9" to "0" to break the toggle, a latch for preventing the toggle from moving to its fully operated position when broken, mechanism for moving the toggle to its fully operated position upon the release of the latch, a transfer mechanism for operating certain elements of the train of lowest order of the register to enter units in said order, tripping means connected to said toggle and engageable with said transfer mechanism for operating the latter when the toggle moves to its fully operated position upon the release of the latch, and means for releasing the latch following the completion of the entry of a number in the totalizer.

4. A typewriting and accounting machine comprising power means, a platen, type bar mechanisms for successively typing characters on a work sheet supported on the platen, a totalizer comprising a series of accumulator trains, a master wheel for successively engaging said trains to enter numbers, digit by digit, in the totalizer, a fugitive unit transfer mechanism controlled by the train of highest denomination when the number wheel of said denomination is rotated from "0" to "9" or from "9" to "0" for operating the train of lowest order to enter a unit therein, means operating when the number wheel of the highest denomination is rotated from "0" to "9" or from "9" to "0" for tripping the transfer mechanism for operation, a catch for preventing the transfer mechanism from completely operating when tripped, means for releasing the catch upon the passage of the master wheel from units toward sub-units position of the totalizer, spring means to complete the operation of the transfer mechanism, and power driven means for resetting said transfer mechanism after its unit entering operation is completed.

OSCAR J. SUNDSTRAND.

REFERENCES CITED

The following references are of record in the file of this patent:

UNITED STATES PATENTS

| Number | Name | Date |
|---|---|---|
| 1,374,762 | Poole | Apr. 12, 1921 |
| 1,376,518 | Duckstine | May 3, 1921 |
| 1,839,211 | Foothorap | Jan. 5, 1932 |
| 2,088,982 | Sundstrand | Aug. 3, 1937 |
| 2,145,254 | Foothorap | Jan. 31, 1939 |
| 2,370,505 | Sundstrand | Feb. 27, 1945 |